(12) United States Patent
Ho et al.

(10) Patent No.: US 8,588,138 B2
(45) Date of Patent: Nov. 19, 2013

(54) HEADER COMPRESSION FOR RELAY NODES

(75) Inventors: Sai Yiu Duncan Ho, San Diego, CA (US); Fatih Ulupinar, San Diego, CA (US); Parag Arun Agashe, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 12/818,733

(22) Filed: Jun. 18, 2010

(65) Prior Publication Data

US 2011/0019617 A1  Jan. 27, 2011

Related U.S. Application Data

(60) Provisional application No. 61/227,942, filed on Jul. 23, 2009.

(51) Int. Cl.
   *H04W 4/00* (2009.01)
(52) U.S. Cl.
   USPC ........................................................ 370/328
(58) Field of Classification Search
   USPC .............. 370/216, 229, 230, 230.1, 235, 310, 370/315, 328, 392, 465, 437, 474, 477
   See application file for complete search history.

(56) References Cited

U.S. PATENT DOCUMENTS 6,967,964 B1 * 11/2005 Svanbro et al. ................ 370/437
7,301,947 B2 * 11/2007 Tourunen et al. .............. 370/392
2002/0018010 A1 * 2/2002 Le .................................... 341/60
2009/0003347 A1   1/2009 Yang et al.
2010/0103865 A1 * 4/2010 Ulupinar et al. ............... 370/315
2010/0182510 A1 * 7/2010 Gerkmann et al. ............ 348/607

(Continued)

FOREIGN PATENT DOCUMENTS

| WO | WO0230043 A2 | 4/2002 |
| WO | WO2006008341 A1 | 1/2006 |
| WO | WO2009099845 | 8/2009 |

OTHER PUBLICATIONS

"LTE-A RAN3 Baseline Document" 3GPP Draft; R3-091447, 3rd Generation Partnership Project (3GPP), Mobile Competence Centre : 650, Route Des Lucioles ; F-06921 Sophia-Antipolis Cedex ; France, No. San Francisco, USA; May 9, 2009, XP050341769 [retrieved on May 9, 2009] the whole document.

(Continued)

*Primary Examiner* — Abdullah Riyami
(74) *Attorney, Agent, or Firm* — Kam T. Tam

(57) ABSTRACT

Systems and methodologies are described that facilitate compressing headers for relay nodes. In particular, a plurality of internet protocol (IP) headers, tunneling protocol headers, and/or other routing headers in a packet can be compressed to facilitate efficient communications of packets between relay nodes and/or a donor access point. A donor or other upstream access point can be provided with a filter mask, bit stream, and filter mask identifier generated by a related relay node for packets having given static header data. Thus, the donor or other upstream access point can apply the filter mask to incoming packet headers, and where a resulting bit stream matches the received bit stream, can replace at least a portion of the packet headers with the filter mask identifier. The relay node can subsequently decompress the packet headers based on the filter mask identifier. Similar functionality can be used for compressing uplink communications.

45 Claims, 17 Drawing Sheets

(56) References Cited

U.S. PATENT DOCUMENTS

| | | | |
|---|---|---|---|
| 2010/0260098 A1* | 10/2010 | Ulupinar et al. | 370/315 |
| 2010/0265873 A1* | 10/2010 | Yi et al. | 370/315 |
| 2010/0272006 A1* | 10/2010 | Bertrand et al. | 370/315 |
| 2010/0272007 A1* | 10/2010 | Shen et al. | 370/315 |
| 2010/0278036 A1* | 11/2010 | Dai et al. | 370/216 |
| 2010/0322151 A1* | 12/2010 | Racz et al. | 370/328 |
| 2011/0128908 A1* | 6/2011 | Lee et al. | 370/328 |
| 2012/0020278 A1* | 1/2012 | Moberg et al. | 370/315 |
| 2012/0028631 A1* | 2/2012 | Chun et al. | 455/422.1 |

OTHER PUBLICATIONS

International Search Report and Written Opinion—PCT/US2010/043160, International Search Authority—European Patent Office—Mar. 10, 2011.

* cited by examiner

HEADER COMPRESSION FOR RELAY NODES

CLAIM OF PRIORITY UNDER 35 U.S.C. §119

The present application for patent claims priority to Provisional Application No. 61/227,942 entitled "HEADER COMPRESSION FOR DATA PACKET NETWORK" filed Jul. 23, 2009, and assigned to the assignee hereof and hereby expressly incorporated by reference herein.

BACKGROUND

1. Field

The following description relates generally to wireless communications, and more particularly to routing packets among multiple access points.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. Access points, however, can be limited in geographic coverage area as well as resources such that mobile devices near edges of coverage and/or devices in areas of high traffic can experience degraded quality of communications from an access point.

Relay nodes can be provided to expand network capacity and coverage area by facilitating communication between mobile devices and access points. For example, a relay node can establish a backhaul link with a donor access point, which can provide access to a number of other relay nodes, and the relay node can establish an access link with one or more mobile devices or additional relay nodes. Thus, there can be multiple relay nodes in a communications path between a mobile device and access point. In certain relay node configurations (e.g., for internet protocol (IP) relay nodes), each relay node can add a header to a received packet to facilitate routing the received packet among the various relay nodes and/or among core network components. Similarly, a given responding packet can include various headers to be processed at each relay node to route the packet to a device related to the received packet. The various headers result in additional data transmitted between each node in a communications path, which can impact data throughput in the wireless network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating compressing protocol headers to provide efficient communication among relay nodes. In particular, for example, a relay node can generate a plurality of parameters related to compressing packet headers that correspond to the relay node, such as a filter mask, an associated bit stream, a filter mask identifier for the bit stream, and/or the like. The relay node can provide the plurality of parameters to a donor access point. The donor access point can compress headers of packets related to the relay node according to the plurality of parameters for transmitting to the relay node, and the relay node can decompress the headers based at least in part on the plurality of parameters. Similarly, for example, a relay node can communicate a plurality of parameters for decompressing packet headers from the relay node to the donor access point, and the donor access point can utilize the plurality of parameters to decompress headers of packets received from the relay node.

According to related aspects, a method is provided that includes receiving a packet from an access point including one or more compressed headers and determining a context related to the packet based at least in part on a filter mask identifier in the one or more compressed headers. The method further includes reconstructing one or more decompressed headers based at least in part on the context and non-static data in the one or more compressed headers.

Another aspect relates to a wireless communications apparatus. The wireless communications apparatus can include at least one processor configured to obtain a packet from an access point including one or more compressed headers and associate a context with the packet based at least in part on a filter mask identifier extracted from the one or more compressed headers. The at least one processor is further configured to decompress the one or more compressed headers into one or more decompressed headers according to the context and non-static data in the one or more compressed headers. The wireless communications apparatus also comprises a memory coupled to the at least one processor.

Yet another aspect relates to an apparatus. The apparatus includes means for receiving a packet from an access point including one or more compressed headers. The apparatus also includes means for determining a context related to the packet based at least in part on a filter mask identifier in the one or more compressed headers and means for reconstructing one or more decompressed headers based at least in part on the context and non-static data in the one or more compressed headers.

Still another aspect relates to a computer program product, which can have a computer-readable medium including code for causing at least one computer to obtain a packet from an access point including one or more compressed headers and code for causing the at least one computer to associate a context with the packet based at least in part on a filter mask identifier extracted from the one or more compressed headers. The computer-readable medium can also comprise code for causing the at least one computer to decompress the one or more compressed headers into one or more decompressed headers according to the context and non-static data in the one or more compressed headers.

Moreover, an additional aspect relates to an apparatus including a packet communicating component that receives a packet from an access point including one or more compressed headers and a component that determines a context related to the packet based at least in part on a filter mask identifier in the one or more compressed headers. The apparatus can further include a header decompressing component that reconstructs one or more decompressed headers based at least in part on the context and non-static data in the one or more compressed headers.

According to another aspect, a method is provided that includes receiving a packet comprising one or more headers including static data and non-static data and determining a filter mask identifier based at least in part on a portion of the static data. The method also includes compressing the one or more headers at least in part by replacing the one or more headers with the filter mask identifier and a portion of the non-static data.

Another aspect relates to a wireless communications apparatus. The wireless communications apparatus can include at least one processor configured to obtain a packet comprising one or more headers and determine a filter mask identifier based at least in part on a portion of static data in the one or more headers. The at least one processor is further configured to compress the one or more headers at least in part by replacing the portion of static data with the filter mask identifier and a concatenation of non-static data in the one or more headers. The wireless communications apparatus also comprises a memory coupled to the at least one processor.

Yet another aspect relates to an apparatus. The apparatus includes means for receiving a packet comprising one or more headers including static data and non-static data and means for determining a filter mask identifier based at least in part on a portion of the static data. The apparatus also includes means for compressing the one or more headers at least in part by replacing the one or more headers with the filter mask identifier and a portion of the non-static data.

Still another aspect relates to a computer program product, which can have a computer-readable medium including code for causing at least one computer to obtain a packet comprising one or more headers and code for causing the at least one computer to determine a filter mask identifier based at least in part on a portion of static data in the one or more headers. The computer-readable medium can also comprise code for causing the at least one computer to compress the one or more headers at least in part by replacing the portion of static data with the filter mask identifier and a concatenation of non-static data in the one or more headers.

Moreover, an additional aspect relates to an apparatus including a packet communicating component that receives a packet comprising one or more headers including static data and non-static data and a component that determines a filter mask identifier based at least in part on a portion of the static data. The apparatus can further include a header compressing component that compresses the one or more headers at least in part by replacing the one or more headers with the filter mask identifier and a portion of the non-static data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
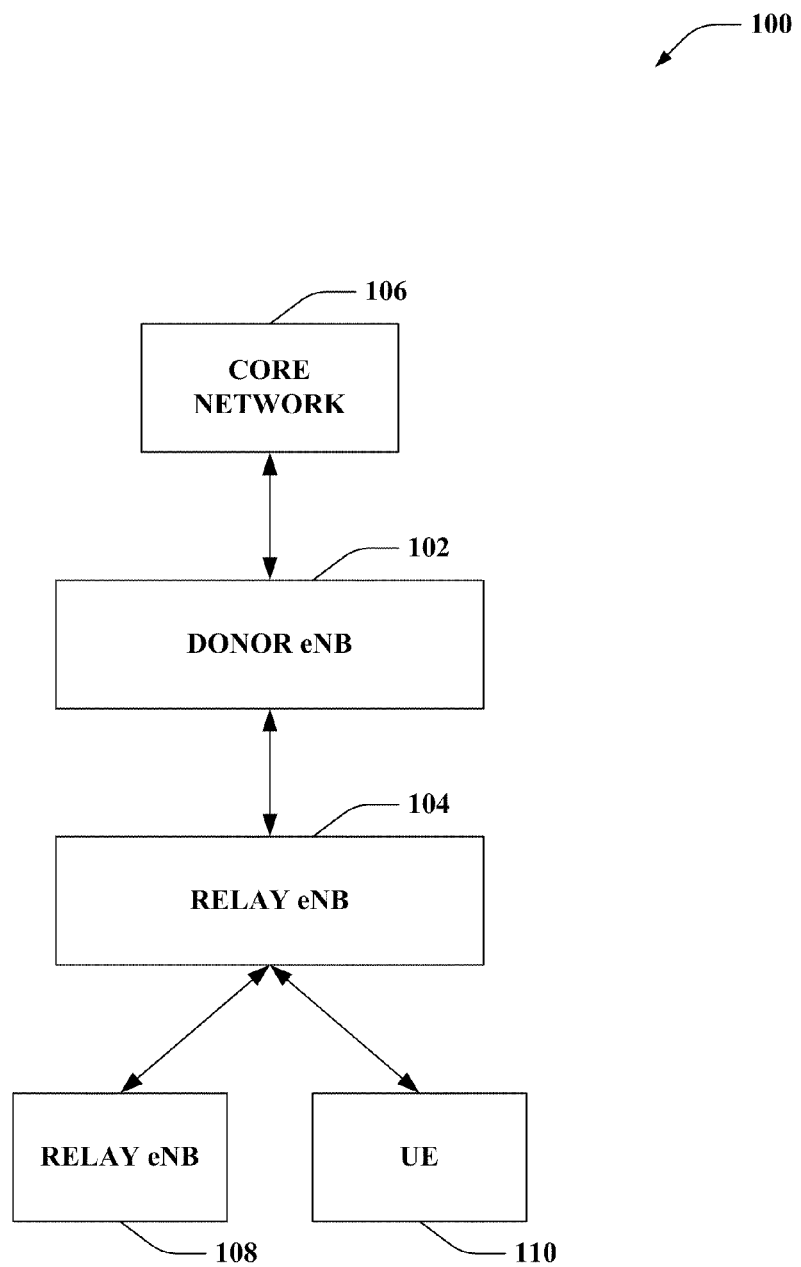
FIG. 1 is an illustration of an example wireless communications system that facilitates providing relays for wireless networks.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates providing relay functionality in wireless networks. System 100 includes a donor eNB 102 that provides one or more relay eNBs, such as relay eNB 104, with access to a core network 106. Similarly, relay eNB 104 can provide one or more disparate relay eNBs, such as relay eNB 108, or UEs, such as UE 110, with access to the core network 106 via donor eNB 102. Donor eNB 102, which can also be referred to as a cluster eNB, can communicate with the core network 106 over a wired or wireless backhaul link, which can be an LTE or other technology backhaul link. In one example, the core network 106 can be a 3GPP LTE or similar technology network.

Donor eNB 102 can additionally provide an access link for relay eNB 104, which can also be wired or wireless, LTE or other technologies, and the relay eNB 104 can communicate with the donor eNB 102 using a backhaul link over the access link of the donor eNB 102. Relay eNB 104 can similarly provide an access link for relay eNB 108 and/or UE 110, which can be a wired or wireless LTE or other technology link. In one example, donor eNB 102 can provide an LTE access link, to which relay eNB 104 can connect using an LTE backhaul, and relay eNB 104 can provide an LTE access link to relay eNB 108 and/or UE 110. Donor eNB 102 can connect to the core network 106 over a disparate backhaul link technology. Relay eNB 108 and/or UE 110 can connect to the relay eNB 104 using the LTE access link to receive access to core network 106, as described. A donor eNB and connected relay eNBs can be collectively referred to herein as a cluster.

According to an example, relay eNB 104 can connect to a donor eNB 102 at the link layer (e.g., media access control (MAC) layer), transport layer, application layer, and/or the like, as would a UE in conventional LTE configurations. In this regard, donor eNB 102 can act as a conventional LTE eNB requiring no changes at the link layer, transport layer, application layer, etc, or related interface (e.g., user-to-user (Uu), such as E-UTRA-Uu, user-to-network (Un), such as EUTRA-Un, etc.), to support the relay eNB 104. In addition, relay eNB 104 can appear to UE 110 as a conventional eNB in LTE configurations at the link layer, transport layer, application layer, and/or the like, such that no changes are required for UE 110 to connect to relay eNB 104 at the link layer, transport layer, application layer, etc., for example. In addition, relay eNB 104 can configure procedures for resource partitioning between access and backhaul link, interference management, idle mode cell selection for a cluster, and/or the like. It is to be appreciated that relay eNB 104 can connect to additional donor eNBs, in one example.

Thus, for example, relay eNB 104 can establish a connection with donor eNB 102 to receive access to one or more components in core network 106 (such as a mobility management entity (MME), serving gateway (SGW), packet data network (PDN) gateway (PGW), etc.). In an example, relay eNB 104 can obtain an internet protocol (IP) address from a PGW/SGW in the core network 106 (e.g., via donor eNB 102) for communicating therewith. In addition, UE 110 can establish a connection with relay eNB 104 to receive access to one or more similar components in core network 106. In this regard, for example, UE 110 can communicate IP packets to relay eNB 104 for providing to core network 106. Relay eNB 104 can obtain the IP packets, associate one or more additional headers with the packets related to relay eNB 104, and provide the packets to donor eNB 102. The additional headers can include an IP or user datagram protocol (UDP)/IP header related to relay eNB 104 and a corresponding component of core network 106, a general packet radio service (GPRS) tunneling protocol (GTP) header or similar header to facilitate routing of the packet to the component of core network 106 and/or routing of a responding packet to relay eNB 104, etc. Thus, donor eNB 102 can route the packets to a component of core network 106 related to relay eNB 104 (e.g., by adding another header and transmitting to core network 106).

Components of core network 106, for example, can route the packets within the core network 106 according to the various IP headers. Moreover, for example, core network 106 can construct packets for providing to UE 110 to include UDP/IP headers, GTP headers, etc., related to routing the packet to UE 110 through relay eNB 104. In an example, core network 106 can include an IP header related to UE 110 with the packet, as well as a UDP/IP and/or GTP header related to relay eNB 104, and/or similar header(s) related to donor eNB 102. Core network 106 can forward the packet with the headers to donor eNB 102. Donor eNB 102 can obtain the packet, remove the UDP/IP and/or GTP header related to donor eNB 102, and forward the packet to relay eNB 104 based on the next GTP header. Relay eNB 104 can similarly remove the header(s) related to relay eNB 104, in one example, and relay eNB 104 can forward the packet to UE 110 based on the remaining IP header or another header. Though one relay eNB is shown between UE 110 and donor eNB 102, it is to be appreciated that additional relay eNBs can exist, and UDP/IP and/or GTP headers can be added to uplink and downlink packets, as described, for each relay eNB to facilitate packet routing.

The additional headers, for example, can introduce overhead when transmitting packets over a radio interface (e.g., between donor eNB 102 and relay eNB 104, relay eNB 104 and relay eNB 108, etc.). Thus, for example, donor eNB 102 can compress downlink packets before transmitting to relay eNB 104, and relay eNB 104 can similarly compress downlink packets before transmitting to relay eNB 108 or UE 110. Similarly, relay eNB 104 can compress uplink packets before transmitting to donor eNB 102, and relay eNB 108 can similarly compress uplink packets. For example, packet headers related to relay eNB 104 can have static data, such as a tunnel endpoint identifier (TEID) related to relay eNB 104, an IP address assigned to relay eNB 104 (e.g., by a corresponding PGW or SGW), and/or the like, that are substantially the same for all packets communicated over a related radio bearer. In addition, however, the packets can have non-static data that can change for a given packet over the radio bearer, such as a packet length, sequence number (e.g., GTP sequence number), and/or the like. In this regard, at least the static data can be compressed for packets related to relay eNB 104 to mitigate sending the entire static data, which can decrease bandwidth required to forward packets thereto.

In an example, relay eNB 104 can provide donor eNB 102 with a plurality of parameters for compressing headers related to relay eNB 104 (e.g., and/or a UE or relay eNB served by relay eNB 104). In this example, upon receiving a packet from donor eNB 102, relay eNB 104 can define a filter mask related to one or more headers in the packet corresponding to relay eNB 104. The filter mask can define which bit values of the one or more headers are compressed. Relay eNB 104 can then determine a bit stream corresponding to the one or more headers based on applying the filter mask thereto and can associate the bit stream with a filter mask identifier. Relay eNB 104 can also store the filter mask identifier (e.g., in a memory), along with context information for reformulating a compressed portion of the one or more headers, such as the TEID, IP address, etc. Relay eNB 104 can then communicate the filter mask, bit stream, and filter mask identifier to the donor eNB 102.

Upon receiving subsequent downlink packets, for example, donor eNB 102 can apply the filter mask to determine a bit stream related to the subsequent downlink packets. If the bit stream matches that received from relay eNB 104, donor eNB 102 can replace the headers of the packet related to relay eNB 104 with the filter mask identifier and non-static data in the headers. It is to be appreciated that the donor eNB 102 can also include a compression indicator that specifies whether headers in the packet are compressed, other uncompressed values, etc., in the packet. Donor eNB 102 can transmit the compressed packet to relay eNB 104, which can determine the context information associated with a received filter mask identifier in the compressed headers. For example, donor eNB 102 can determine the packet relates to relay eNB 104 based at least in part on the resulting bit stream, and thus donor eNB 102, in this example, need not interpret the UDP/IP or GTP header of the packet that corresponds to relay eNB 104. Relay eNB 104, for example, reconstructs the packet based on the context information (e.g., along with any uncompressed values in the header). It is to be appreciated, for example, that relay eNB 104 can verify a compression indicator in the packet to determine one or more headers are compressed.

In another example, relay eNB 104 can generate similar parameters for uplink communications and can provide the parameters to donor eNB 102 for decompressing communications from relay eNB 104. For example, relay eNB 104 can generate a filter mask, a related bit stream (or other context), and a filter mask identifier upon receiving a packet from UE 110 or relay eNB 108. Relay eNB 104 can provide the filter mask identifier and an associated decompression context to donor eNB 102. Relay eNB 104 can compress one or more headers in the packet based at least in part on replacing a bit stream with the filter mask identifier, and can transmit the packet to donor eNB 102. Donor eNB 102 can determine the filter mask identifier in one or more headers and can reconstruct the one or more headers based on the received decompression context information, which can include instructions and/or parameters for decompressing the one or more headers according to the filter mask identifier and any non-static data. In this regard, headers can be compressed before transmission and decompressed upon receipt to optimize bandwidth required to communicate packets over a radio interface. This can be particularly useful in speed sensitive transmissions, such as streaming (e.g., voice calls, audio/video data streaming, multi-player gaming, etc.).

In addition, though many examples herein are described utilizing UDP/IP and GTP headers, it is to be appreciated that the functionalities can be applied for compressing static data (and/or non-static) of substantially any generic routing encapsulation (GRE) headers. For example, in a data optimized (DO) network, the inner most header can be compressed and associated with a filter mask identifier, as described herein.

Figure 2:
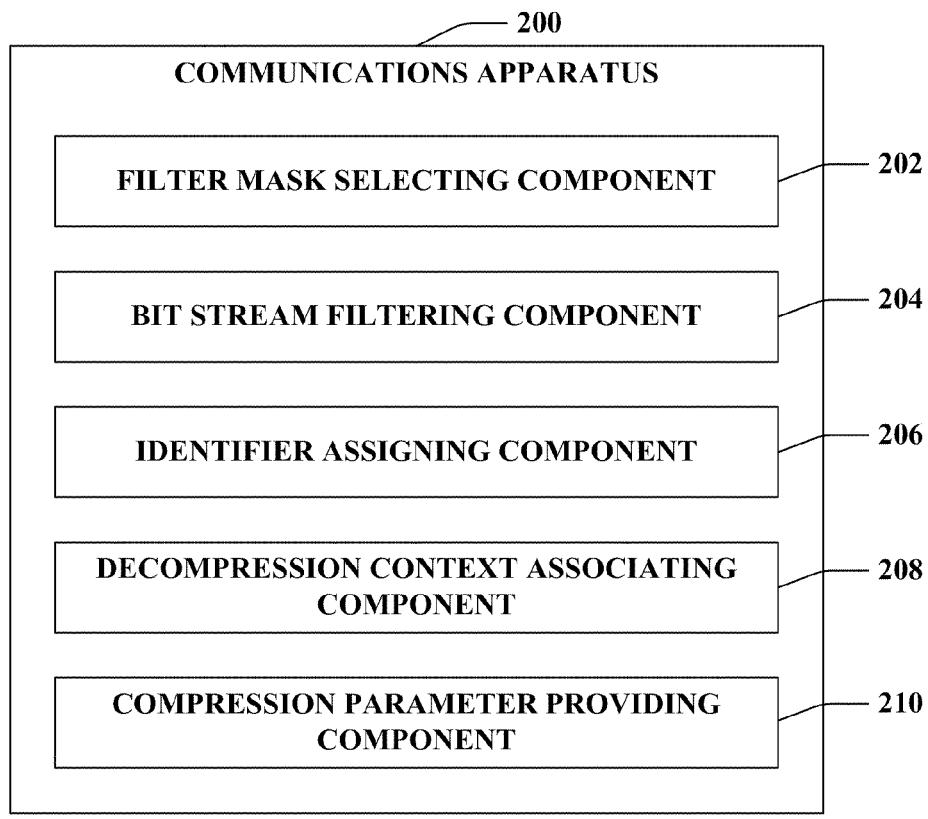
FIG. 2 is an illustration of an example communications apparatus for employment within a wireless communications environment.

Turning now to FIG. 2, a communications apparatus 200 that can participate in a wireless communications network is illustrated. The communications apparatus 200 can be a mobile device, access point, relay node, a portion thereof, or substantially any device that communicates in a wireless network. Communications apparatus 200 can comprise a filter mask selecting component 202 that determines a filter mask for associating with a received packet header to filter a portion of data therefrom, a bit stream filtering component 204 that formulates a bit stream by applying the filter mask to the received packet header to obtain the portion of data, and an identifier assigning component 206 that correlates a filter mask identifier with the portion of data for subsequent compression of one or more packet headers. Communications apparatus 200 further includes a decompression context associating component 208 that stores the filter mask identifier along with one or more parameters related to reconstructing the received packet header from a compressed header based at least in part on the filter mask identifier, and a compression parameter providing component 210 that communicates the one or more parameters to a disparate communications apparatus for compressing one or more packet headers.

According to an example, communications apparatus 200 can communicate with an access point to provide one or more devices with access to a wireless network. Upon receiving a packet from an access point, for example, filter mask selecting component 202 can determine a filter mask to apply to the packet for extracting static data therefrom. As described, for example, the packet can include one or more headers that can comprise static data, such as an IP address or TEID related to communications apparatus 200, a protocol type, version, message type, and/or the like. In one example, filter mask selecting component 202 can select a filter mask based at least in part on one or more fields in the packet header. For example, where the packet header includes a sequence number of the packet, filter mask selecting component 202 can choose a filter mask to account for the sequence number in size, but that does not extract the sequence number from the header (e.g., since it can be a dynamic parameter).

Moreover, for example, bit stream filtering component 204 can apply the filter mask to the packet, and/or one or more headers thereof, to generate a bit stream representative of one or more static data in the headers. Identifier assigning component 206 can associate a filter mask identifier with the bit stream, for example. The filter mask identifier can be a value comprising multiple bits as well, but can include a less number of bits than the one or more headers. For example, the filter mask identifier can correlate to the bit stream such that it can be utilized in compressing communications that include the bit stream. In this regard, compression parameter providing component 210 can communicate the filter mask, bit stream, and filter mask identifier to an access point for compressing subsequent packets with the same static data. Moreover, decompression context associating component 208 can additionally store instructions or other parameters for reconstructing a header based at least in part on the filter mask identifier.

Thus, for example, upon receiving a packet, the access point can apply the filter mask, and where the result correlates to the bit stream, the access point can transmit the filter mask identifier instead of the static data that corresponds to the bit stream (e.g., IP address, TEID, etc.). It is to be appreciated, however, that the access point can include non-static data in the header while compressing at least a portion of the static data as the filter mask identifier. Additionally, for example, upon receiving packets with compressed headers, decompression context associating component 208 can be utilized to reconstruct the compressed headers based at least in part on parameters and/or instructions stored with the filter mask identifier, as described previously.

Figure 3:
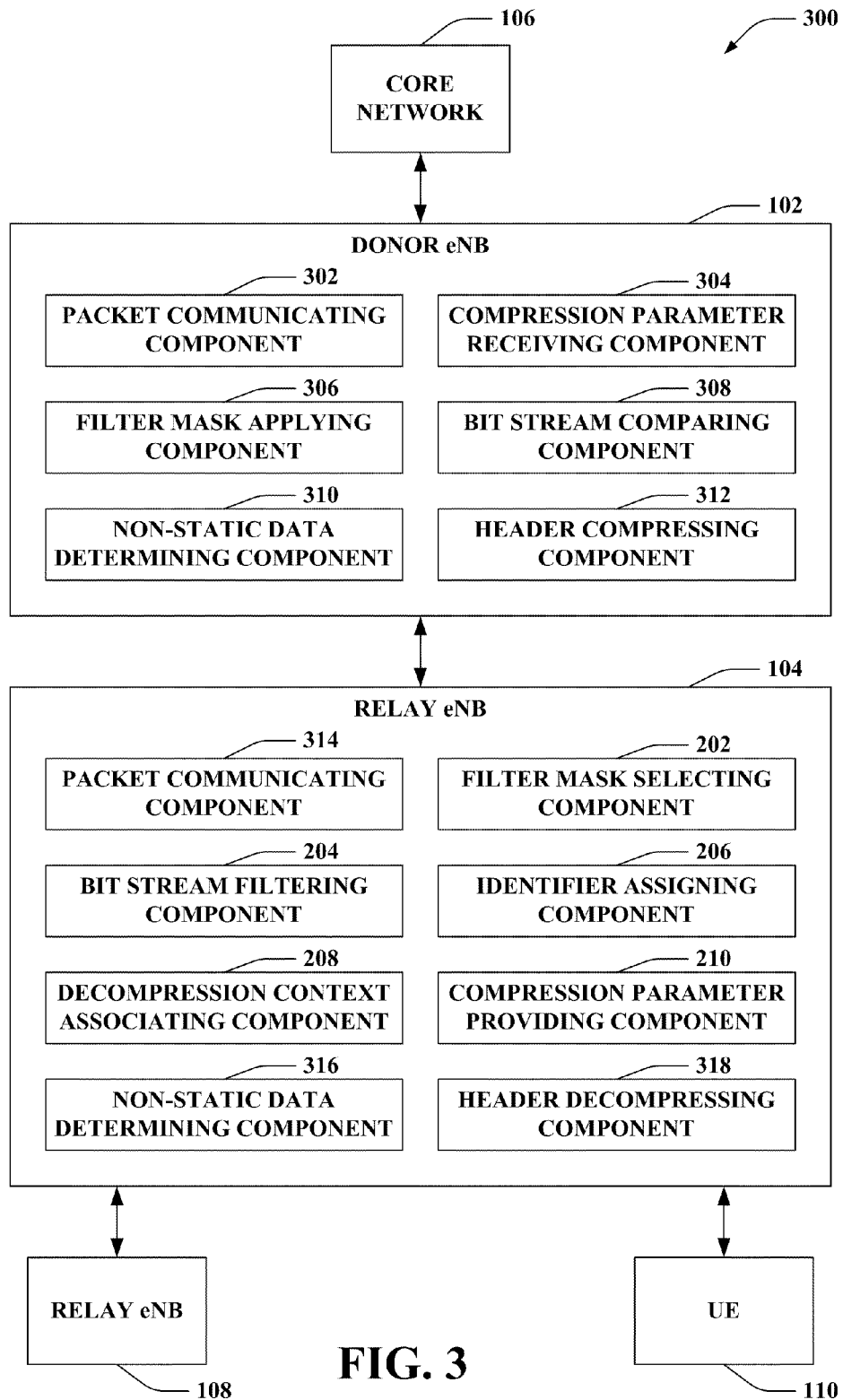
FIG. 3 is an illustration of an example wireless communications system that compresses packet headers for efficient communications among relay nodes.

Turning now to FIG. 3, an example wireless communication system 300 that facilitates compressing downlink packet headers for efficient communication thereof is illustrated. System 300 includes a donor eNB 102 that provides relay eNB 104 (and/or other relay eNBs) with access to core network 106. Additionally, as described, relay eNB 104 can provide one or more devices, such as UE 110, and/or other relay eNBs, such as relay eNB 108, with access to the core network 106 through the donor eNB 102. In addition, it is to be appreciated that relay eNB 104 can comprise the components of donor eNB 102 to provide similar functionality to relay eNB 108 (e.g., and relay eNB 108 can comprise components of relay eNB 104), in one example. Moreover, donor eNB 102 can be a macrocell access point, femtocell access point, picocell access point, mobile base station, and/or the like. Relay eNBs 104 and 108 can similarly each be a mobile or stationary relay node that communicates with donor eNB 102 over a wireless or wired backhaul, as described.

Donor eNB 102 comprises a packet communicating component 302 that receives packets from a core network and transmits the packets to a relay eNB, and/or vice versa, a compression parameter receiving component 304 that obtains one or more compression parameters from a relay eNB, and a filter mask applying component 306 that generates a bit stream at least in part by applying the filter mask to one or more received packet headers. Donor eNB 102 also includes a bit stream comparing component 308 that determines whether the bit stream matches a bit stream related to the one or more compression parameters, a non-static data determining component 310 that extracts non-static data from the one or more received packet headers, and a header compressing component 312 that generates a compressed header based at least in part on a filter mask identifier associated with the bit stream that relates to the one or more compression parameters.

Relay eNB 104 comprises a packet communicating component 314 that receives packets from one or more upstream eNBs (e.g., a donor eNB or relay eNB) for communicating to a downstream relay eNB or UE, and/or vice versa. Relay eNB 104 also includes a filter mask selecting component 202 that determines a filter mask for one or more received packet headers, a bit stream filtering component 204 that applies the filter mask to the one or more received packet headers to formulate a bit stream representative of at least a portion of static data in the one or more packet headers, and an identifier assigning component 206 that associates the bit stream with a filter mask identifier. Relay eNB 104 additionally comprises a decompression context associating component 208 that stores the filter mask identifier with one or more parameters or instructions for reconstructing a packet header to include static data based at least in part on the filter mask identifier, a compression parameter providing component 210 that transmits one or more compression parameters to a donor eNB, a non-static data determining component 316 that extracts non-static data from one or more received packet headers, and a header decompressing component 318 that formulates a decompressed header based at least in part on the non-static data and a filter mask identifier of the one or more received packet headers.

According to an example, packet communicating component 302 can obtain a packet from core network 106 related to relay eNB 104 and can transmit the packet to relay eNB 104. In one example, packet communicating component 302 can determine the packet relates to relay eNB 104 based at least in part on a TEID or similar parameter in a header of the packet. Packet communicating component 314 can receive the packet from donor eNB 102. Filter mask selecting component 202 can determine a filter mask to apply to the packet, as described, which can be based on a format of the packet, the relay eNB 104 related to the packet, and/or the like. For example, the filter mask can be a series of bit values (e.g., 0 or 1) where 0's correlate to non-static data of one or more headers of the packet, and 1's correlate to at least a portion of static data of the one or more headers that can be compressed.

In this example, bit stream filtering component 204 can apply the filter mask to a bit value representation of the one or more headers. For example, where the filter mask is a series of bit values, bit stream filtering component 204 can perform a logical OR between the one or more headers and the filter mask. The resulting bit stream can represent static data in the one or more headers that can be compressed. Identifier assigning component 206 can associate a filter mask identifier with the bit stream. As described, for example, the filter mask identifier can be a value having a less number of bits than the bit stream to facilitate compressing the bit stream portion of subsequent packet headers. Decompression context associating component 208 can store the filter mask with parameters or instructions for reconstructing the one or more headers from the bit stream. For example, decompression context associating component 208 can store static data from the header, a position of the static data within the header, the headers, a position of non-static data in the headers, and/or similar information (e.g., with respect to non-static data or otherwise). In addition, in this example, compression parameter providing component 210 can communicate the filter mask, bit stream, and filter mask identifier to donor eNB 102.

Compression parameter receiving component 304 can obtain the parameters from relay eNB 104 and can store the parameters for subsequently compressing packets, for instance. In this example, donor eNB 102 can then receive packets related to relay eNB 104, and/or one or more UEs or relay eNBs (such as UE 110 or relay eNB 108) communicating therewith, from core network 106. Filter mask applying component 306 can select a filter mask to apply to one or more headers in a given packet related to relay eNB 104 to generate a related bit stream that corresponds to static data in the one or more headers. For example, filter mask applying component 306 can apply a filter mask based on a format of the packet, based on determining the packet relates to relay eNB 104, and/or the like. In another example, filter mask applying component 306 can select plurality of filter masks for application to one or more headers of the packet until a certain bit stream is computed.

Thus, for example, bit stream comparing component 308 can attempt to locate the resulting bit stream as a bit stream previously received by compression parameter receiving component 304. If bit stream comparing component 308 locates a matching bit stream, it can determine a filter mask identifier associated with the bit stream, as received by compression parameter receiving component 304. Additionally, where bit stream comparing component 308 locates a matching bit stream, non-static data determining component 310 can extract non-static data from the one or more headers. Header compressing component 312 can create a compressed header for the related packet based at least in part on specifying the filter mask identifier in the compressed header along with the non-static data. In one example, the non-static data can be concatenated with one another and further concatenated to the filter mask identifier. Moreover, for example, header compressing component 312 can set a compression indicator in the packet, which can include initializing the compression indicator, to specify that the packet includes a compressed header. This can also be concatenated to the filter mask identifier and non-static data in the compressed header, for example. Packet communicating component 302 can transmit the packet with the compressed header to relay eNB 104, in an example.

In this example, packet communicating component 314 can obtain the packet from donor eNB 102. In addition, packet communicating component 314 can determine that the packet has a compressed header based at least in part on a compression indicator, as described, which can be in the compressed header, a value in a packet data convergence protocol (PDCP) or other lower layer of the packet, as described herein, and/or the like. In this example, non-static data determining component 316 can extract non-static data from the compressed header (e.g., as concatenated to the filter mask identifier), and header decompressing component 318 can reformulate a decompressed header from the compressed header based at least in part on the filter mask identifier and the non-static data. For example, header decompressing component 318 can receive parameters or instructions for reconstructing the header from decompression context associating component 208 based on the filter mask identifier. In this example, decompression context associating component 208 can provide static data stored with the filter mask identifier, positions in the header related to the static data, the headers themselves with positions of non-static data in the headers, and/or the like, and header decompressing component 318 can utilize this information to generate the decompressed header.

In an example, where bit stream comparing component 308 cannot locate a related bit stream in parameters received by compression parameter receiving component 304, packet communicating component 302 can initialize a compression indicator to specify the related one or more headers are not compressed. In this example, packet communicating component 314 can receive the one or more headers and determine the one or more headers are not compressed. In this case, filter mask selecting component 202 can determine a filter mask for applying to the one or more headers, etc., to generate new compression parameters for the one or more headers, as described above.

According to an example, packet communicating component 302 can receive the packet from core network 106 related to relay eNB 104 and can transmit the packet to relay eNB 104 having a format similar to the following.

| L1 | MAC | Radio Link Control (RLC) | PDCP | UDP/IP header (with IP_ReNB) | GTP header (with TEID_ReNB) | IP Packet |
|---|---|---|---|---|---|---|

In this regard, the UDP/IP and GTP headers can be compressed, as described, to decrease size of the packet and thus bandwidth required to communicate the packet. For example, at least the IP address of the relay eNB 104 (IP_ReNB) and the TEID of the relay eNB 104 (TEID_ReNB) can be compressed as these values are static for the given relay eNB 104 (e.g., at least for a period of time) over a related radio bearer with donor eNB 102. Thus, for example, filter mask selecting component 202 can create or select a filter mask for applying to the packet (e.g., based at least in part on a size of the packet and/or of the UDP/IP and GTP headers, based at least in part on whether a GTP sequence number or other parameter is present, etc.). Bit stream filtering component 204 can apply the filter mask to the bits of the UDP/IP and GTP headers in the packet to produce a bit stream representing at least a portion of static data in the headers.

Identifier assigning component 206, as described, can correlate a filter mask identifier to the bit stream, and decompression context associating component 208 can store the filter mask identifier with a context, as described, which can include parameters and/or instructions for reconstructing a header from a subsequently received compressed header, such as the UDP/IP and/or GTP headers, related static data (such as the IP_ReNB and TEID_ReNB), positions of the static or non-static data within the headers, and/or the like. Compression parameter providing component 210 can provide the filter mask, bit stream, and associated filter mask identifier to donor eNB 102. It is to be appreciated, as described, that relay eNB 104 can compute the parameters each time an uncompressed packet is received from core network 106 (e.g., thus each time a packet is received for which donor eNB 102 does not possess the compression parameters, which can mean the packet has new static data). Thus, for example, relay eNB 104 can provide compression parameters for each tunnel with donor eNB 102, which can have differing IP addresses and/or TEIDs.

As described, compression parameter receiving component 304 can obtain the filter mask, bit stream, and associated filter mask identifier. Upon receiving a subsequent packet from core network 106 over packet communicating component 302, filter mask applying component 306 can select a filter mask received by compression parameter receiving component 304 for application to the packet, as described. In an example, filter mask applying component 306 can determine where to apply the filter mask in the packet (e.g., to which bits) based at least in part on one or more parameters hardcoded in the donor eNB 102, received in a network specification or configuration, received from one or more components of core network 106, and/or the like. Bit stream comparing component 308 can determine whether the resulting bit stream matches that received by compression parameter receiving component 304 (or one or more disparate bit streams, for example). If so, non-static data determining component 310 can discern non-static data in the packet, such as a header or packet length, a GTP sequence number, and/or the like. Header compressing component 312 can create a packet having a compressed header, which can be similar to the following format:

| L1 | MAC | RLC | PDCP | C | FMID | NSI | IP Packet | where C is a compression indicator (which can be a single bit for true or false), FMID is the filter mask identifier, and NSI is non-static information (e.g., non-static data). As described, for example, NSI can include values of the headers that are not part of the bit stream (e.g., the bits corresponding to 0's in a bit stream filter mask). The NSI, in an example, can be a concatenation of non-static data, for example. Thus, header compressing component 312 can compress the UDP/IP and GTP headers of the packet to the smaller FMID and include the NSI. The compression indicator, C, in another example, can be indicated in a reserved bit in the PDCP layer so as not to require the extra bit shown above. Packet communicating component 302 can transmit the packet with the compressed header to relay eNB 104.

Packet communicating component 314 can obtain the packet and can determine whether one or more headers in the packet are compressed based at least in part on the compression indicator, which can be part of the PDCP layer or a single bit in the headers, as described previously. Where one or more headers are compressed, for example, header decompressing component 318 can determine the filter mask identifier in the header. In this example, non-static data determining component 316 can discern the non-static data in the compressed header (e.g., which can follow the filter mask identifier, as shown), and header decompressing component 318 can reconstruct the header based at least in part on the filter mask identifier and the non-static data. For example, header decompressing component 318 can determine the context stored by the decompression context associating component 208 based on the filter mask identifier, and can reconstruct the header based at least in part on instructions and/or parameters in the context.

Thus, in one example, upon initially receiving the non-compressed packet, applying the filter mask, generating the bit stream, and associating the bit stream with the filter mask identifier, the decompression context associating component 208 can have stored the UDP/IP and GTP headers, along with locations of non-static data in the headers. In this example, header decompressing component 318 can reconstruct the subsequently received compressed header by replacing the non-static data of the stored UDP/IP and GTP headers with NSI received in the compressed headers. For example, the context can include locations, sizes, etc., of the non-static data within the UDP/IP and GTP headers, and header decompressing component 318 can accordingly replace bits in the UDP/IP and GTP headers with those in the subsequently received packet, as determined by non-static data determining component 316.

In another example, upon initially receiving the non-compressed packet, applying the filter mask, generating the bit stream, and associating the bit stream with the filter mask identifier, the decompression context associating component 208 can have stored static data from the UDP/IP and GTP headers (e.g., an IP address and TEID of relay eNB 104), along with locations of the static data within the headers. In this example, header decompressing component 318 can reconstruct the subsequently received compressed header by inserting the static data of the stored UDP/IP and GTP headers in the non-static data received in the compressed headers according to the locations.

In yet another example, header compressing component 312 can additionally compress one or more non-static data portions of the one or more headers. For example, for certain portions of the non-static data, header compressing component 312 can determine a number of least significant bits (LSB), n, of the non-static data and only transmit the n bits. In the example above, where a GTP sequence number is present in at least one header, the non-static data determining component 310 can discern the GTP sequence number, after applying the filter mask, as non-static data. In one example, the GTP sequence number can be 16 bits, which can be more bits than typically required for a sequence number, in one example. Thus, header compressing component 312 can compress the header by associating a filter mask identifier for the static fields, and can also, according to a hardcoded or otherwise configured algorithm for example, include only n LSBs of the GTP sequence number in the NSI portion of the compressed header. Upon receiving the compressed header, header decompressing component 318 can utilize a similar algorithm to extract the n LSBs and regenerate the 16-bit GTP sequence number in reconstructing the header.

Moreover, as described, relay eNB 108 can include similar components as relay eNB 104 to facilitate communicating compressed headers with donor eNB 102. Where relay eNBs of multiple depth support compression of headers, a hop count can be utilized by the donor eNB 102 when determining parameters for compressing the headers. For example, packet communicating component 302 can receive a packet from core network 106 intended for relay eNB 108 (and/or a device communicating therewith) and can transmit the packet to relay eNB 104 based on a TEID or similar parameter. Packet communicating component 314 can similarly determine the packet relates to relay eNB 108 (e.g., based on a TEID or similar parameter) and can transmit the packet thereto. Relay eNB 108 can generate compression parameters based on one or more headers in the packet related to relay eNB 108, as described with respect to relay eNB 104 above, and can transmit the compression parameters to relay eNB 104, which can forward the compression parameters to donor eNB 102. Relay eNB 108 can include a hop count in the compression parameters, which can be initialized to 0.

In this regard, compression parameter receiving component 304 can associate the received compression parameters with the hop count of 0. In addition, relay eNB 104 can generate its compression parameters for the header related to relay eNB 104 in the packet. Compression parameter providing component 210 can communicate the compression parameters to donor eNB 102 along with an incremented hop count of 1. Compression parameter receiving component 304 can obtain the compression parameters and associate them with the hop count 1. Where additional relay eNBs exist between relay eNB 104 and donor eNB 102, though not shown, a hop count can be similarly incremented and provided to donor eNB 102 with the compression parameters.

Thus, when packet communicating component 302 obtains packets related to relay eNB 108, filter mask applying component 306 can attempt to associate filter masks corresponding to hop count 0 with the outermost UDP/IP and GTP headers, and bit stream comparing component 308 can determine whether one or more resulting bit streams correlate to a bit stream for which a filter mask identifier is received for hop count 0. If so, header compressing component 312 can compress the outermost headers, as described. Subsequently, filter mask applying component 306 can then apply filter masks associated with hop count 1 to the next UDP/IP and GTP headers, and bit stream comparing component 308 can determine whether the resulting bit streams correlate to a bit stream for which a filter mask identifier is received for hop count 1. If so, header compressing component 312 can compress the headers, and so on. Moreover, for example, header compressing component 312 can specify a compression indicator for headers related to each relay eNB. In an example, a PDCP reserved bit can be utilized to indicate compression for an outermost header, and the outermost header can include a bit that indicates compression for the next outermost header, and so on.

Once filter mask applying component 306 determines it does not have filter masks related to a hop count and/or bit stream comparing component 308 cannot locate a resulting bit stream among those related to received filter mask identifiers, packet communicating component 302 can transmit the packet to relay eNB 104, which can decompress its portion of the compressed headers and transmit to relay eNB 108, etc. In one example, relay eNB 104 can determine the packet relates to relay eNB 108 based on the decompressed headers. In addition, for example, relay eNB 104 can remove its decompressed headers before forwarding the packet to relay eNB 108. Relay eNB 108 can then decompress its headers from the packet, etc.

Figure 4:
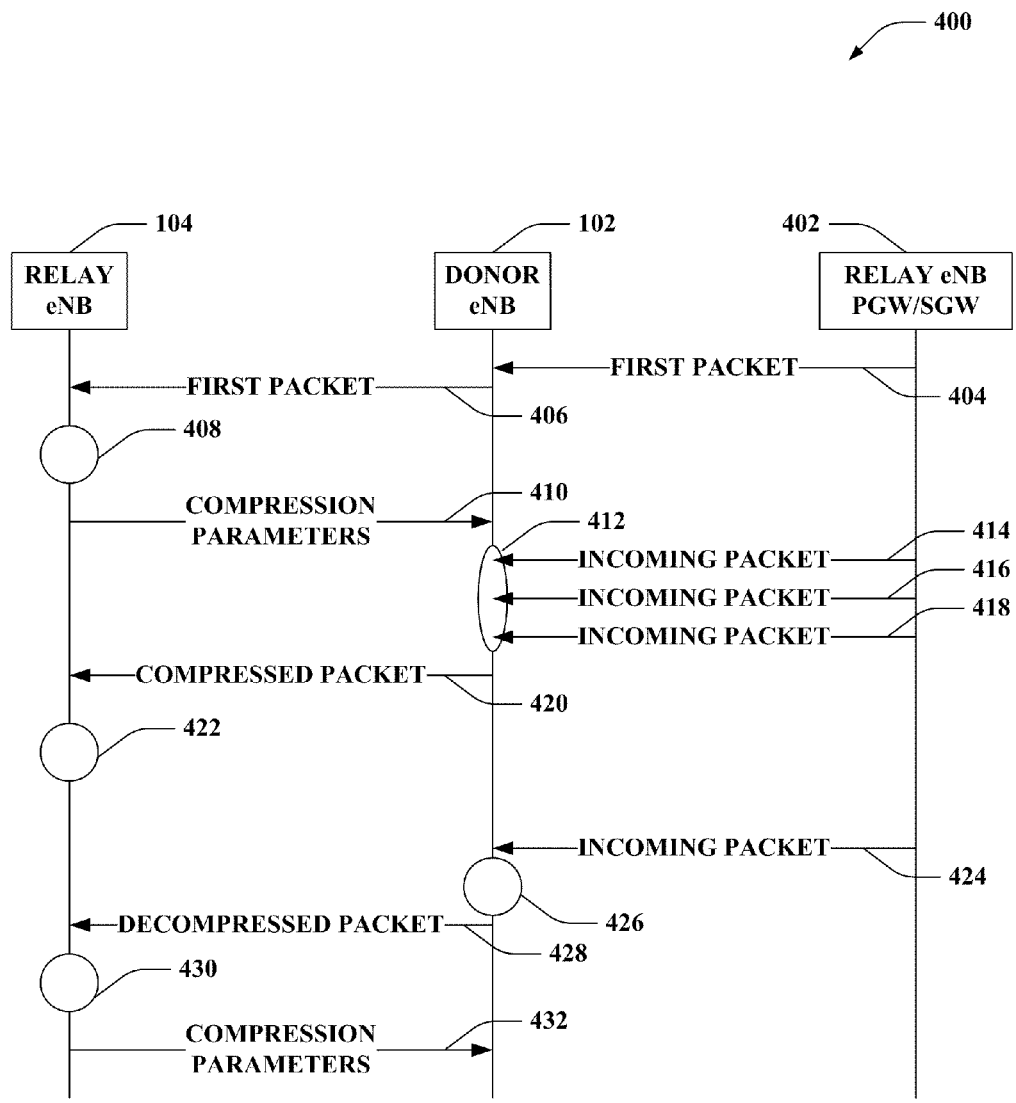
FIG. 4 is an illustration of an example wireless communications system that facilitates compressing packets for communicating to a relay node according to received compression parameters.

Referring to FIG. 4, an example wireless communication system 400 for compressing and decompressing headers related to routing packets among one or more relay nodes is illustrated. System 400 includes a donor eNB 102 that provides wireless network access to relay eNB 104, as described. In addition, system 400 can include a relay eNB PGW/SGW 402. As described, relay eNB PGW/SGW 402 can be part of a core network, and donor eNB 102 can provide relay eNB 104 with access to relay eNB PGW/SGW 402. In an example, relay eNB 104 can establish connection to relay eNB PGW/SGW 402 through donor eNB 102 and can receive an IP address from relay eNB PGW/SGW 402 for communicating therewith. In addition, relay eNB PGW/SGW 402 can receive or generate a TEID related to relay eNB 104 to include in packets for relay eNB 104 when providing the packets to donor eNB 102.

For example, following connection to relay eNB 104, relay eNB PGW/SGW 402 can transmit a first packet 404 to donor eNB 102 for providing to relay eNB 104. For example, donor eNB 102 can receive the first packet 404 from relay eNB PGW/SGW 402 over a wired backhaul. The first packet 404 can include a UDP/IP and GTP header related to relay eNB 104, as described. Donor eNB 102 can determine that the first packet 404 relates to relay eNB 104 (e.g., based at least in part on a TEID in a GTP header of first packet 404). In addition, donor eNB 102 can determine that it does not have any filter masks associated with relay eNB 104 (e.g., or a related radio bearer) and can transmit the first packet 406 to relay eNB 104 uncompressed. For example, first packet 406 can include at least a portion of first packet 404 and can also comprise a compression indicator (e.g., as a separate header bit, as a reserved PDCP layer bit, and/or the like) that specifies first packet 406 is not compressed. At 408, relay eNB 104 can determine that first packet 406 is uncompressed based on the compression indicator, as described. In addition, at 408, relay eNB 104 selects a filter mask for the first packet 406, applies the filter mask to first packet 406 to generate a bit stream, and assigns a filter mask identifier to the bit stream.

In addition, as described, relay eNB 104 can create a context at 408 that associates the filter mask identifier with parameters and/or instructions for reconstructing a header upon receiving a compressed version of the header. For example, the parameters can include an IP address of relay eNB 104, a TEID of relay eNB 104, etc., along with location information for the parameters within corresponding non-static data, the headers themselves along with location information for non-static data, and/or the like, as described. Relay eNB 104 can transmit compression parameters 410 to donor eNB 102, which can include the filter mask, bit stream, filter mask identifier, and/or the like. Donor eNB 102 can receive incoming packets 414, 416, and 418 from relay eNB PGW/SGW 402, and can determine whether any of the incoming packets 414, 416, and 418 can be compressed based on the compression parameters (and/or other received compression parameters) at 412. For example, as described, donor eNB 102 can determine that it has a filter mask related to relay eNB 104 and can apply the filter mask received in compression parameters at 410 (or in other compression parameters) to the incoming packets 414, 416, and 418 that relate to relay eNB 104. In this regard, at 412, donor eNB 102 can determine whether the resulting bit streams match a corresponding bit stream received in compression parameters at 410. In this example, incoming packet 416 can match the bit stream when applying the filter mask, and donor eNB 102 can transmit a corresponding compressed packet 420 to relay eNB 104 including a corresponding filter mask identifier related to static data in incoming packet 416, non-static data in the packet, and/or a compression indicator.

Relay eNB 104 can decompress the compressed packet 420 at 422. This can include determining the packet is compressed based on the compression indicator, decompressing the packet based at least in part on obtaining the filter mask identifier and determining a related context, etc. As described, the related context can specify information for reconstructing a header related to the filter mask identifier, etc. Moreover, at 422, relay eNB 104 can further decompress the packet by associating the non-static data from the compressed header with the header to be reconstructed, as described. Furthermore, in one example, relay eNB 104 can also decompress the packet by decompressing non-static data, such as a GTP sequence number, according to a pre-defined algorithm, as described. Relay eNB PGW/SGW 402 can subsequently provide another incoming packet 424 to donor eNB 102, and donor eNB 102 can determine whether it can compress incoming packet 424 at 426. As described, this can include applying one or more filter masks to incoming packet 424 to determine a bit stream, and comparing the bit stream to one or more bit streams received as compression parameters (e.g., as part of compression parameters 410 or otherwise).

In addition, for example, donor eNB 102 can determine that the incoming packet 424 relates to relay eNB 104 based at least in part on a TEID in the incoming packet 424 (e.g., in a GTP header). Donor eNB 102 can determine that it cannot compress the packet at 426, and can transmit a corresponding decompressed packet 428 to relay eNB 104. Relay eNB 104 can select a filter mask, apply the filter mask to the packet to generate a bit stream, and associate a filter mask identifier with the bit stream, as described, at 430. In addition, as described for example, relay eNB 104 can generate a context for the filter mask identifier. Relay eNB 104 can transmit the compression parameters 432 (e.g., filter mask, bit stream, filter mask identifier, etc., as described) to donor eNB 102, as described above.

Figure 5:
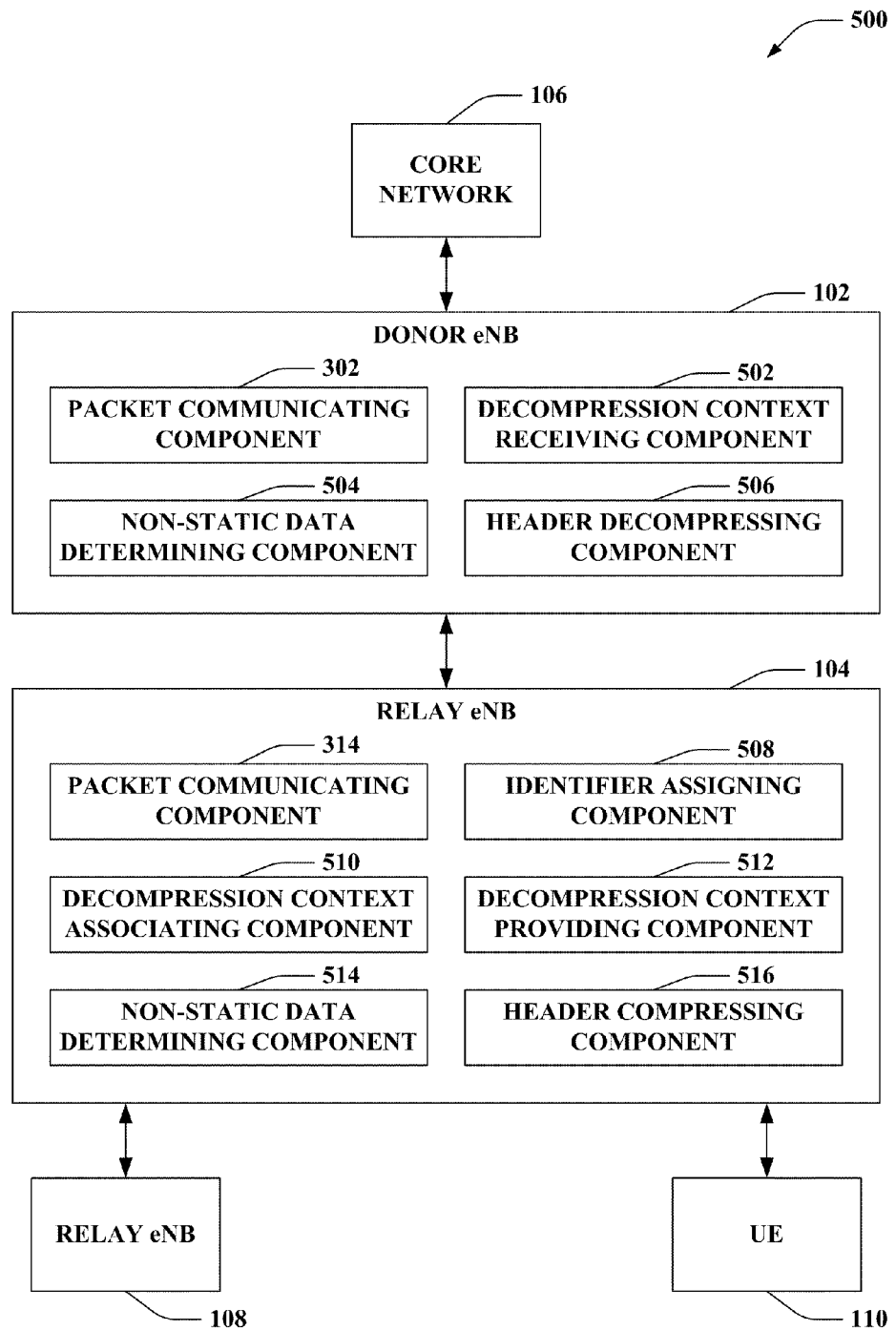
FIG. 5 is an illustration of an example wireless communications system that compresses packet headers for communicating to upstream access points.

Turning now to FIG. 5, an example wireless communication system 500 that facilitates compressing uplink packet headers for efficient communication thereof is illustrated. System 500 includes a donor eNB 102 that provides relay eNB 104 (and/or other relay eNBs) with access to core network 106. Additionally, as described, relay eNB 104 can provide one or more devices, such as UE 110, and/or other relay eNBs, such as relay eNB 108, with access to the core network 106 through the donor eNB 102. In addition, it is to be appreciated that relay eNB 104 can comprise the components of donor eNB 102 to provide similar functionality to relay eNB 108 (e.g., and relay eNB 108 can comprise components of relay eNB 104), in one example. Moreover, donor eNB 102 can be a macrocell access point, femtocell access point, picocell access point, mobile base station, and/or the like. Relay eNBs 104 and 108 can similarly each be a mobile or stationary relay node that communicates with donor eNB 102 over a wireless or wired backhaul, as described.

Donor eNB 102 comprises a packet communicating component 302 that receives packets from a relay eNB and transmits the packets to a core network, and/or vice versa, and a decompression context receiving component 502 that obtains one or more parameters or instructions related to decompressing one or more packet headers. Donor eNB 102 also includes a non-static data determining component 504 that extracts non-static data from one or more compressed headers of a received packet and a header decompressing component 506 that decompresses the one or more compressed headers based at least in part on the parameters or instructions related to decompressing the one or more packet headers.

Relay eNB 104 comprises a packet communicating component 314 that receives packets from one or more downstream relay eNBs or UEs and transmits the packets to one or more upstream eNBs (such as a relay eNB or donor eNB), and/or vice versa. Relay eNB 104 also includes an identifier assigning component 508 that associates a filter mask identifier with one or more packets received from the one or more downstream relay eNBs or UEs and a decompression context associating component 510 that stores the filter mask identifier with one or more parameters or instructions for reconstructing a packet header to include static data that correlates to the filter mask identifier, and a decompression context providing component 512 that communicates the stored filter mask identifier and one or more parameters or instructions to an access point for decompressing subsequent packet headers. Relay eNB 104 can further include a non-static data determining component 514 that extracts non-static data from one or more received packet headers and a header compressing component 516 that compresses a received packet header based at least in part on replacing static data by a filter mask identifier.

According to an example, packet communicating component 314 can obtain a packet from relay eNB 108 or UE 110. Identifier assigning component 508 can determine whether a filter mask identifier is assigned that correlates to static data in a header of the packet (e.g., an IP address, TEID, etc.). If not, identifier assigning component 508 can generate a filter mask identifier to correlate to the static data of the header. Decompression context associating component 510 can store the filter mask identifier along with a context for decompressing a header that includes the filter mask identifier. As described, for example, the context can include the static data, locations to insert the static data, UDP/IP and/or GTP headers related to the packet, locations to insert non-static data within the headers, and/or the like. Decompression context providing component 512 can transmit the context (e.g., along with the filter mask identifier) to donor eNB 102.

Decompression context receiving component 502 can receive and store the decompression context (e.g., in a memory) for subsequently decompressing compressed headers transmitted by relay eNB 104. Thus, non-static data determining component 514, as described, can determine non-static data in the packet received from relay eNB 108 or UE 110 and one or more headers related thereto. In one example, relay eNB 104 can generate a UDP/IP and/or GTP header for the packet. Header compressing component 516 can compress the UDP/IP and/or GTP header at least in part by inserting a compression indicator, FMID, and NSI in place of the headers in the packet, as described previously. Moreover, as described previously in one example, the compression indicator can be included in a PDCP layer of the packet. Packet communicating component 314 can transmit the compressed packet to donor eNB 102.

Packet communicating component 302 can obtain the compressed packet and can determine that the header is compressed based on the compression indicator, as described. Header decompressing component 506 can determine whether decompression context receiving component 502 has stored a context for decompressing the compressed packet based at least in part on determining a filter mask identifier in the compressed packet. If so, non-static data determining component 504 can discern the non-static data in the packet (e.g., a GTP sequence), and header decompressing component 506 can decompress the packet based on the context and non-static data. As described, for example, where the related context includes original UDP/IP and GTP headers, header decompressing component 506 can replace non-static data in the headers with non-static data received by non-static data determining component 504 (e.g., based on location information in the context). Similarly, for example, where the related context includes location information for static data, header decompressing component 506 insert the static data within the non-static data, as described previously. Furthermore, it is to be appreciated that non-static data, such as a GTP sequence number, can be compressed as well by header compressing component 516 and decompressed by header decompressing component 506, as described above.

Moreover, as described, relay eNB 108 can include similar components as relay eNB 104 to facilitate communicating compressed headers with donor eNB 102. Where relay eNBs of multiple depth support compression of headers, a hop count can be utilized by the donor eNB 102 when determining a context for decompressing the headers. Relay eNB 108 can receive a packet from a UE communicating therewith (not shown) and can provide a decompression context to donor eNB 102 corresponding to headers related to relay eNB 108, as described with respect to relay eNB 104, via relay eNB 104. Relay eNB 108 can also include a hop count initialized at 0 with the decompression context. Upon receiving the packet from relay eNB 108, decompression context associating component 510 can generate a decompression context related to headers that correspond to relay eNB 104, as described. Moreover, for example, decompression context providing component 512 can modify the hop count (which can include incrementing the hop count) to 1 and can communicate the decompression context to donor eNB 102 with the incremented hop count. Where additional relay eNBs exist between relay eNB 104 and donor eNB 102, the additional relay eNBs can similarly provide decompression contexts with incremented hop counts.

Thus, relay eNB 108 can compress headers of the packet received from the UE related to relay eNB 108, as described with respect to relay eNB 104 above, and can transmit the packet with compressed headers to relay eNB 104. Packet communicating component 314 can receive the packet, and header compressing component 516 can compress headers in the packet related to relay eNB 104, as described. Packet communicating component 314 can transmit the packet to donor eNB 102. For example, the packet can have a format similar to the following.

pressing component 506 can then determine whether FMID1 matches any filter mask identifiers received for hop count 1, decompress based on a related context, and so on. Moreover, in an example, the compression indicator for the outermost header (C0) can exist within the PDCP layer, and in this regard, C0, above, can be the compression indicator for the next outermost header (e.g., related to FMID1 and NSI1). In this example, C1, above, would then relate to a possible next header, and be false, since the next header after FMID1 and NSI1 is the IP packet.

Furthermore, in an example, where header decompressing component 506 cannot locate a filter mask identifier related to a received compressed header, it can query relay eNB 104 for requesting the related context. Decompression context providing component 512, in this regard, can transmit the context to donor eNB 102 upon request, and header decompressing component 506 can utilize the context to decompress a current or subsequently received packet, for example. Additionally, decompression context providing component 512 can include a related hop count in transmitting the context where utilized, as described above.

Figure 6:
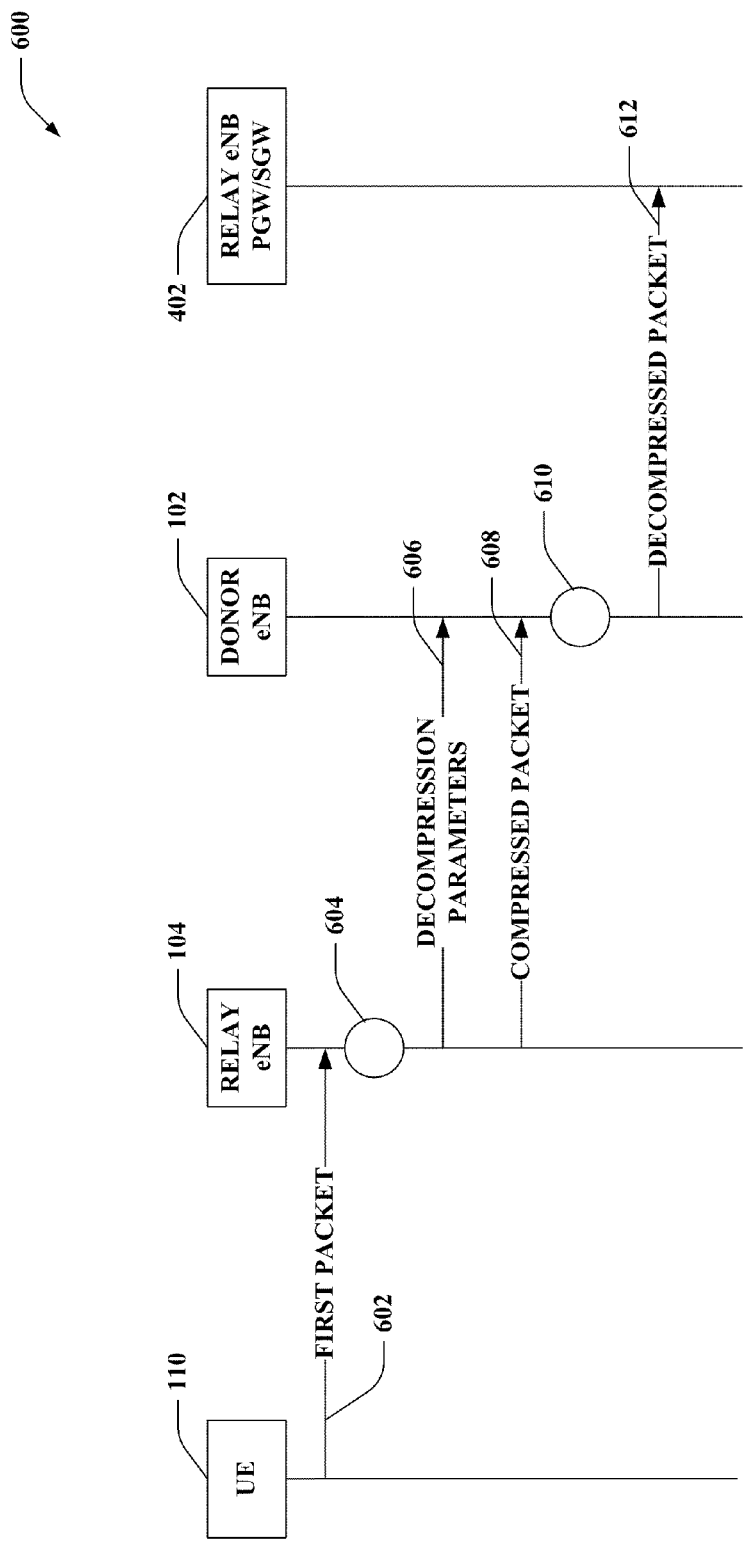
FIG. 6 is an illustration of an example wireless communications system that facilitates decompressing packets according to received compression parameters.

Referring to FIG. 6, an example wireless communication system 600 for compressing and decompressing headers related to routing packets among one or more relay nodes is illustrated. System 600 includes a donor eNB 102 that provides wireless network access to relay eNB 104, as described, and a UE 110 that receives wireless network access from relay eNB 104. In addition, system 600 can include a relay eNB PGW/SGW 402. As described, relay eNB PGW/SGW 402 can be part of a core network, and donor eNB 102 can provide relay eNB 104 with access to relay eNB PGW/SGW 402. In an example, relay eNB 104 can establish connection to relay eNB PGW/SGW 402 through donor eNB 102 and can receive an IP address for communicating with relay eNB PGW/SGW 402. In addition, relay eNB PGW/SGW 402 can receive or generate a TEID related to relay eNB 104 to include in packets for relay eNB 104 when providing the packets to donor eNB 102.

For example, UE 110 can connect to relay eNB 104 and transmit a first packet 602 thereto. At 604, relay eNB 104 can generate a filter mask identifier for static fields in the first packet 602 or related to a header associated with the packet by relay eNB 104. In addition, at 604, relay eNB 104 can define a context for decompressing a compressed header based on the filter mask identifier. As described, the context can include static data in the header (e.g., an IP address or TEID), locations for inserting the static data, the header itself, locations for inserting non-static data within the header, and/or the like. Relay eNB 104 can provide decompression parameters to donor eNB 102, which can include the filter mask identifier and the context. In addition, relay eNB 104 can transmit the compressed packet 608 to donor eNB 102. Donor eNB 102 can decompress the packet at 610. As described, this can

| L1 | MAC | RLC | PDCP | C0 | FMID0 | NSI0 | C1 | FMID1 | NSI1 | IP Packet |
| --- | --- | --- | --- | --- | --- | --- | --- | --- | --- | --- | where C0, FMID0, and NSI0 relate to relay eNB 108, and C1, FMID1, and NSI1 relate to relay eNB 104. Packet communicating component 302 can receive the packet, and header decompressing component 506 can decompress headers of the packet by determining if FMID0 matches any filter mask identifiers received for hop count 0. If so, header decompressing component 506 can decompress the related portion of the header according to an associated context. Header decominclude utilizing the context to decompress the packet. Donor eNB 102 can transmit the decompressed packet 612 to relay eNB PGW/SGW 402 (e.g., based at least in part on one or more parameters of the decompressed header).

Figure 7:
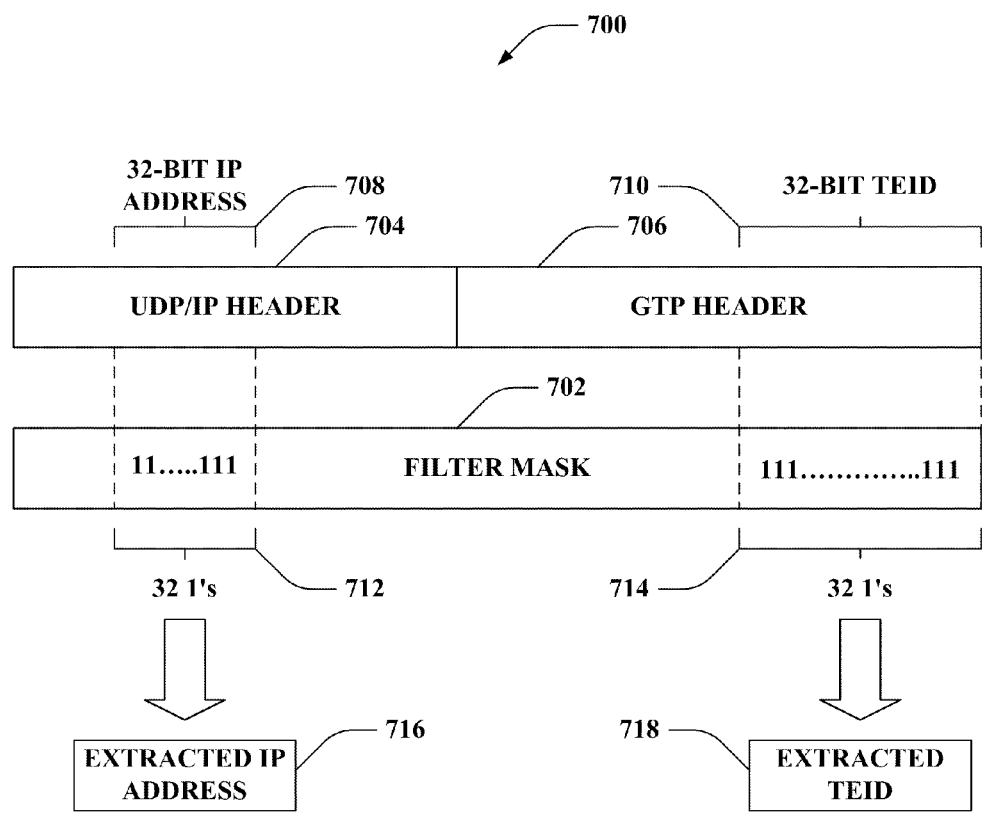
FIG. 7 is an illustration of an example packet header and filter mask for applying to the packet header to extract static data therefrom.

Turning to FIG. 7, an example packet header 700 is illustrated to which a filter mask 702 is applied to extract static data therefrom. For example, packet header 700 can be received by a relay eNB from a donor eNB, as described, as an initial packet, received by donor eNB as a subsequent packet for compressing, and/or the like. In either case, filter mask 702 can be applied to packet header 700, as described. Packet header 700 can comprise a UDP/IP header 704 and a GTP header 706. As described, UDP/IP header 704 can include a 32-bit IP address 708, which can be represented by 32 bits of the UDP/IP header 704, and GTP header 706 can comprise a 32-bit TEID 710, which can be represented by 32 bits of the GTP header 706. As described, packets received from a core network at the donor eNB that are related to the relay eNB (or at least a related radio bearer between the donor eNB and relay eNB) can have the same IP address and TEID (and/or additional data in the UDP/IP header 704 and/or GTP header 706, as described).

In this example, filter mask 702 can include a plurality of bits such that 1 bits represent data to be extracted from the UDP/IP header 704 and GTP header 706 (e.g., static data), and 0 bits represent data not to be extracted. Thus, for example, filter mask 702 includes 32 1's 712 corresponding to a portion of the UDP/IP header 704 that includes the 32-bit IP address 708, and 32 1's 714 that correspond to a portion of the GTP header 714 that includes the 32-bit TEID 710. In this regard, an OR operation is performed between the packet header 700 and filter mask 702 to generate the extracted IP address 716 and extracted TEID 718. In one example, the extracted IP address 716 and extracted TEID 718 can be concatenated to form a bit stream for identifying subsequent packets with the same IP address and TEID, as described, using filter mask 702.

Thus, as described, a relay eNB can apply filter mask 702 to the packet header 700, where the packet header is a received uncompressed header, to generate a bit stream comprising the extracted IP address 716 and extracted TEID 718 for association to a filter mask identifier. The relay eNB can provide the filter mask 702, bit stream, and filter mask identifier, as described, to the donor eNB. Donor eNB can subsequently apply filter mask 702 to subsequently received packet headers 700 to determine whether a resulting bit stream of extracted IP address 716 and extracted TEID 718 match the received bit stream. If so, the packet header 700 can be compressed by specifying the associated filter mask identifier (e.g., along with non-static data in packet header 700) instead of the packet header 700, as described.

In one example, the following fields for the following header types can be included in filter mask 702 as specified. GTP Header:

| Field Name | Original length (bits) | Mask Value | Compared Value | Compressed length (bits) |
|---|---|---|---|---|
| Version | 3 | '111' | 1 | 0 [Static] |
| Protocol Type (PT) | 1 | '1' | 1 | 0 [Static] |
| Reserved | 1 | '1' | 0 | 0 [Static] |
| Extension header flag (E) | 1 | '1' | 0 | 0 [Static] |
| Sequence Number flag (S) | 1 | '1' | 0 | 0 [Static] |
| N-packet data unit (PDU) number flag (PN) | 1 | '1' | 0 | 0 [Static] |
| Message Type | 8 | '11 ... 1' | 255 (G-PDU) | 0 [Static] Can be fixed for user traffic |
| Length | 16 | '00 ... 0' | — | 0 [Static] Length provided by PDCP at the decompressor |
| Tunnel endpoint identifier (TEID) | 32 | '11 ... 1' | TEID_ReNB | 10 [static] Assuming 100 UE's and 8 Uu RB's each => 800 TEID's needed. Note donor eNB doesn't know which TEID corresponds to which UE. |
| Sequence number | 16 | '00 ... 0' | — | 0 or n-bit [Non-Static]. This can be an optional field. |
| N-PDU number | 8 | '1' | 0 | 0 [Static] N-PDU is used for PDCP sequence number during handover |
| Next extension header type | 8 | '1' | 0 | 0 [Static] assuming no extended header is allowed |

UDP Header:

| Field Name | Original length (bits) | Mask Value | Compared Value | Compressed length (bits) |
|---|---|---|---|---|
| Source Port | 16 | '11 ... 1' | The value received at the 1st non-compressed packet | 0 [Static] |
| Destination Port | 16 | '11 ... 1' | 2152 (GTP-U port number) | 0 [Static] |
| Length | 16 | '00 ... 0' | — | 0 [Non-static] |
| Checksum | 16 | '00 ... 0' | — | 0 [Non-static] |

IPv4 Header:

| Field Name | Original length (bits) | Mask Value | Compared Value | Compressed length (bits) |
|---|---|---|---|---|
| Version | 4 | '11...1' | 4 (IPv4) | 0 |
| Header Length | 4 | '00...0' | — | 0 |
| Diff serv | 8 | '00...0' | — | 0 |
| Total Length | 16 | '00...0' | — | 0 |
| Identification | 16 | '00...0' | — | 0 |
| Flags | 3 | '00...0' | — | 0 |
| Fragment Offset | 13 | '00...0' | — | 0 |
| Time to Live | 8 | '00...0' | — | 0 |
| Protocol | 8 | '11...1' | 17 (UDP) | 0 |
| Header Checksum | 16 | '00...0' | — | 0 |
| Source Address | 32 | '11...1' | The value received at the 1$^{st}$ non-comp packet | 0 |
| Destination Address | 32 | '11...1' | IP_ReNB | 0 |

IPv6 Header (Fixed Part):

| Field Name | Original length (bits) | Mask Value | Compared Value | Compressed length (bits) |
|---|---|---|---|---|
| Version | 4 | '11...1' | 6 (IPv6) | 0 |
| Traffic Class | 8 | '11...1' | The value received in the 1$^{st}$ packet | 0 |
| Flow Label | 20 | '00...0' | — (Not used) | 0 |
| Payload Length | 16 | '00...0' | — | 0 |
| Next Header | 8 | '11...1' | 4 (UDP) | 0 |
| Hop Limit | 8 | '00...0' | — | 0 |
| Source Address | 128 | '11...1' | The value received in the 1$^{st}$ packet | 0 |
| Destination Address | 128 | '11...1' | IP_ReNB | 0 |

Figure 8:
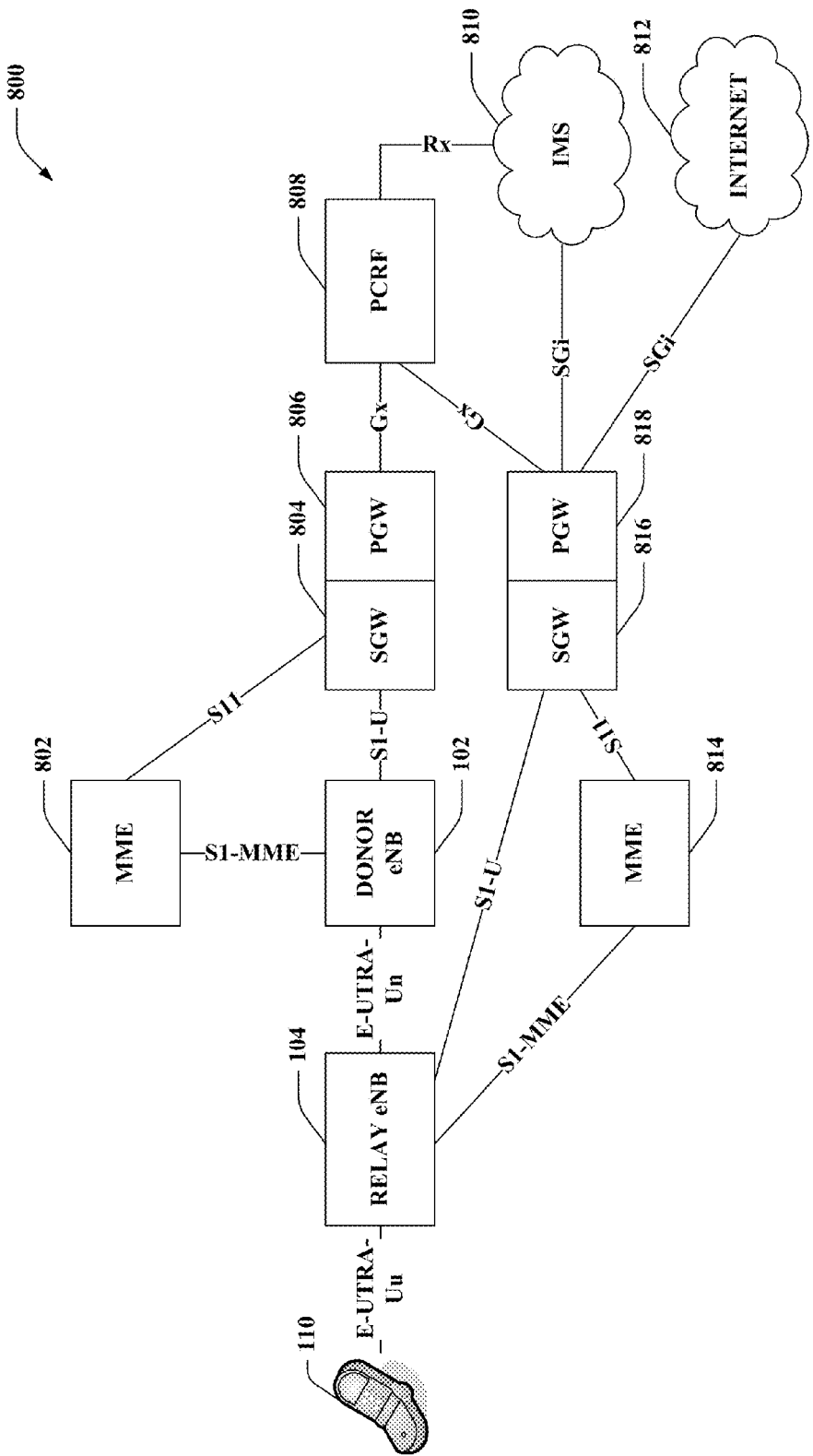
FIG. 8 is an illustration of an example wireless communications system that utilizes IP relays to provide access to a wireless network.

Now turning to FIG. 8, an example wireless communication network 800 that provides IP relay functionality is depicted. Network 800 includes a UE 110 that communicates with a relay eNB 104, as described, to receive access to a wireless network. Relay eNB 104 can communicate with a donor eNB 102 to provide access to a wireless network, and as described, donor eNB 102 can communicate with an MME 802 and/or SGW 804 that relate to the relay eNB 104. SGW 804 can connect to or be coupled with a PGW 806, which provides network access to SGW 804 and/or additional SGWs. PGW 806 can communicate with a policy and charging rules function (PCRF) 808 to authenticate/authorize relay eNB 104 to use the network, which can utilize an IP multimedia subsystem (IMS) 810 to provide addressing to the relay eNB 104.

According to an example, SGW 804 and PGW 806 can also communicate with SGW 816 and PGW 818, which can be related to UE 110. For example, SGW 816 and/or PGW 818 can assign an IP address to UE 110 and can communicate therewith via SGW 804 and PGW 806, donor eNB 102, and relay eNB 104. Communications between UE 110 and SGW 816 and/or PGW 818 can be tunneled through the nodes. SGW 804 and PGW 806 can similarly tunnel communications between UE 110 and MME 814. PGW 818 can similarly communicate with a PCRF 808 to authenticate/authorize UE 110, which can communicate with an IMS 810. In addition, PGW 818 can communicate directly with the IMS 810 and/or internet 812.

In an example, UE 110 can communicate with the relay eNB 104 over one or more radio protocol interfaces, such as an E-UTRA-Uu interface, as described, and the relay eNB 104 can communicate with the donor eNB 102 using one or more radio protocol interfaces, such as an E-UTRA-Un or other interface. As described, relay eNB 104 can add a UDP/IP and/or GTP header related to SGW 804 and/or PGW 806 to packets received from UE 110. Moreover, relay eNB 104 can compress the UDP/IP and GTP headers, as described herein, and can forward the packets to donor eNB 102 along with a decompression context. Donor eNB 102 communicates with the MME 802 using an S1-MME interface and the SGW 804 and PGW 806 over an S1-U interface, as depicted. For example, donor eNB 102 can decompress the packets according to the received context and can similarly add an UDP/IP and/or GTP header to the packets and forward to MME 802 or SGW 804.

SGW 804 and/or PGW 806 can utilize the UDP/IP and/or GTP headers to route the packets within the core network. For example, as described, SGW 804 and/or PGW 806 can receive the packets and remove the outer UDP/IP and/or GTP header, which relates to the SGW 804 and/or PGW 806. SGW 804 and/or PGW 806 can process the next UDP/IP and/or GTP header to determine a next node to receive the packets, which can be SGW 816 and/or PGW 818, which relate to UE 110. Similarly, SGW 816 and/or PGW 818 can obtain downlink packets related to UE and can include an UDP/IP header and/or GTP header related to communicating the packets to relay eNB 104 for providing to UE 110. SGW 816 and/or PGW 818 can forward the packets to SGW 804 and/or PGW 806, which relate to relay eNB 104. SGW 804 and/or PGW 806 can further include an additional UDP/IP and/or GTP header in the packets related to donor eNB 102.

SGW 804 and/or PGW 806 can communicate the packets to donor eNB 102 over a tunnel (e.g., by including one or more parameters in the GTP header included by SGW 804 and/or PGW 806). Donor eNB 102 can remove the outer GTP and/or UDP/IP header included by SGW 804 and/or PGW 806 and can determine a next node to receive the packets. Donor eNB 102 can compress the packets according to a received filter mask, bit stream, and filter mask identifier, as described, and can transmit the packets to relay eNB 104 over a radio bearer related to a GTP tunnel Relay eNB 104 can receive the packets and can decompress the headers according to a stored context related to the filter mask identifier, as described. Relay eNB 104 can also determine a next node to receive the packets and/or a bearer over which to transmit the packets based at least in part on one or more parameters in the next UDP/IP or GTP header, the radio bearer over which the packets are received, etc. Relay eNB 104 can remove the UDP/IP and GTP headers related to relay eNB 104, compress remaining headers, in one example, and transmit the packets to UE 110. UE 110, as described, can decompress compressed headers at a PDCP layer for processing thereof by an upper communication layer.

Figure 9:
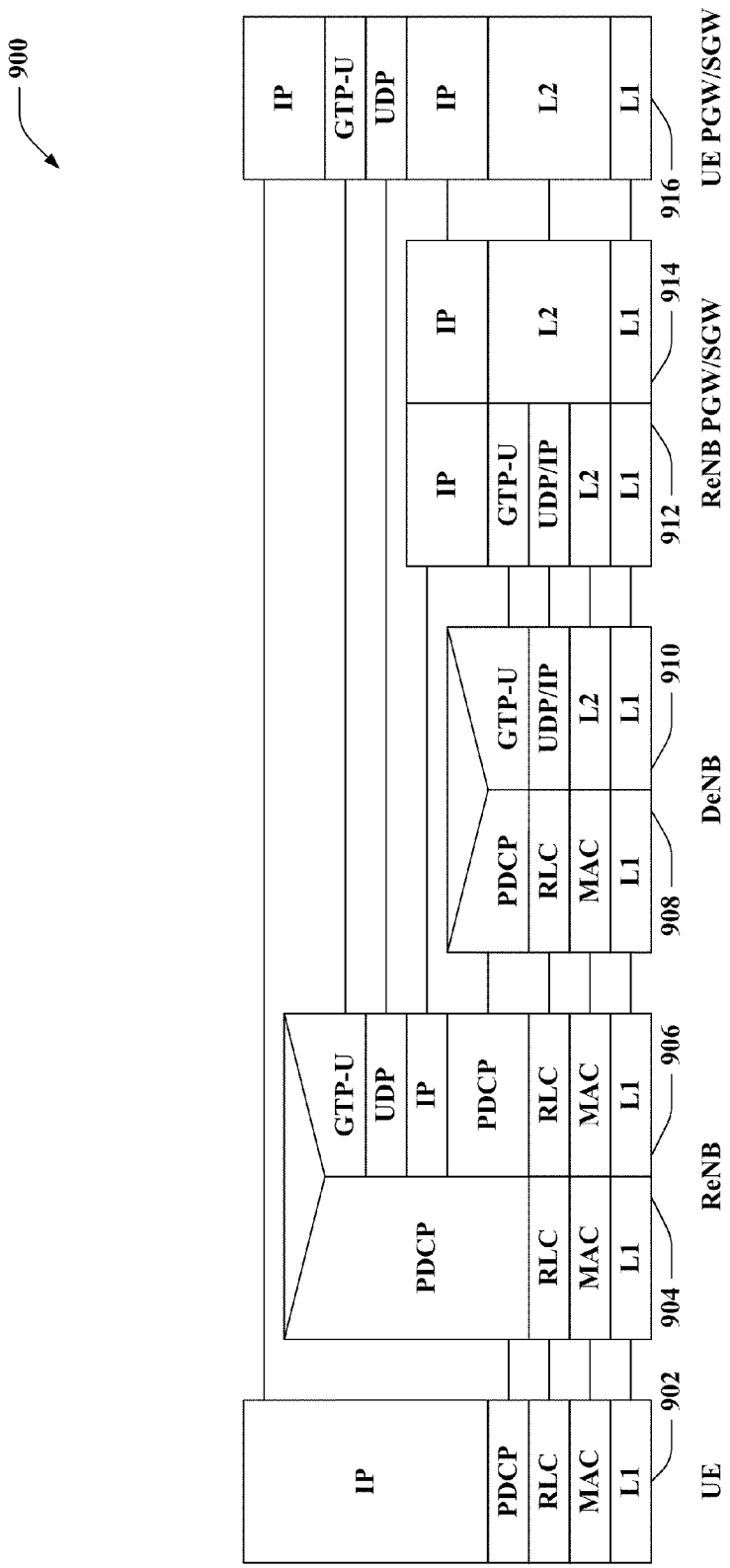
FIG. 9 is an illustration of example protocol stacks that facilitate providing IP relay functionality.

Referring to FIG. 9, example protocol stacks 900 are illustrated that facilitate communicating in a wireless network to provide relay functionality. A UE protocol stack 902 is shown comprising an L1 layer, MAC layer, an RLC layer, a PDCP layer, and an IP layer. A relay eNB (ReNB) access link protocol stack 904 is depicted having an L1 layer, MAC layer, RLC layer, and PDCP layer, along with an ReNB backhaul link protocol stack 906 having an L1 layer, MAC layer, RLC layer, PDCP layer, IP layer, UDP layer, and GTP-U layer. A donor eNB (DeNB) access link protocol stack 908 is also shown having an L1 layer, MAC layer, RLC layer, and a PDCP layer, along with a DeNB backhaul link protocol stack 910 having an L1 layer, L2 layer, a UDP/IP layer, and a GTP-U. In addition, an ReNB PGW/SGW access link protocol stack 912 is shown having an L1 layer, L2 layer, UDP/IP layer, GTP-U layer, and IP layer, as well as a ReNB PGW/SGW backhaul link protocol stack 914 including an L1 layer, L2 layer, and IP layer. Moreover, a UE PGW/SGW protocol stack 916 is depicted having an L1 layer, L2, layer, IP layer related to ReNB PGW/SGW, UDP layer, GTP-U layer, and an IP layer related to a UE.

According to an uplink communication example, a UE can communicate with an ReNB for IP communications to a UE PGW/SGW. In this regard, UE can communicate over L1, MAC, RLC, and PDCP layers with the ReNB (e.g., using a EUTRA-Uu interface), as shown between protocol stacks 902 and 904. The UE can tunnel IP layer communications through the ReNB and other entities to the UE PGW/SGW, which assigns an IP address to the UE, as shown between protocol stacks 902 and 916. To facilitate such tunneling, the ReNB can insert an IP header to communicate access link packets to an ReNB PGW/SGW through one or more other nodes on the backhaul link, as shown between protocol stacks 906 and 912. In addition, ReNB inserts GTP-U and UDP headers related to the UE PGW/SGW, as shown between protocol stacks 906 and 916, to facilitate the tunneling.

Moreover, ReNB and can communicate with a DeNB over L1, MAC, RLC, and PDCP layers (e.g., using an EUTRA-Un interface), as shown between protocol stacks 906 and 908. The DeNB can remove the PDCP, RLC, and MAC layers, which facilitate air communications, and can subsequently communicate with ReNB PGW/SGW over L1, L2, UDP/IP, and GTP-U layers, as shown between protocol stacks 910 and 912. In this regard, DeNB can add the GTP-U and UDP/IP layers related to ReNB the PGW/SGW to tunnel the GTP-U, UDP, and IP layers of the ReNB to the ReNB PGW/SGW. ReNB PGW/SGW can remove the GTP-U and UDP/IP layers, and can subsequently communicate with UE PGW/SGW over L1, L2, and IP layers to tunnel IP communications from UE, as described. Thus, as described, IP and/or GTP headers between the ReNB and DeNB can be compressed and decompressed according to parameters communicated to the DeNB by the ReNB. It is to be appreciated that similar procedures can be utilized to tunnel downlink packets from the UE PGW/SGW to the UE.

Referring to FIGS. 10-13, methodologies relating to compressing packet headers for relay communication are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 10:
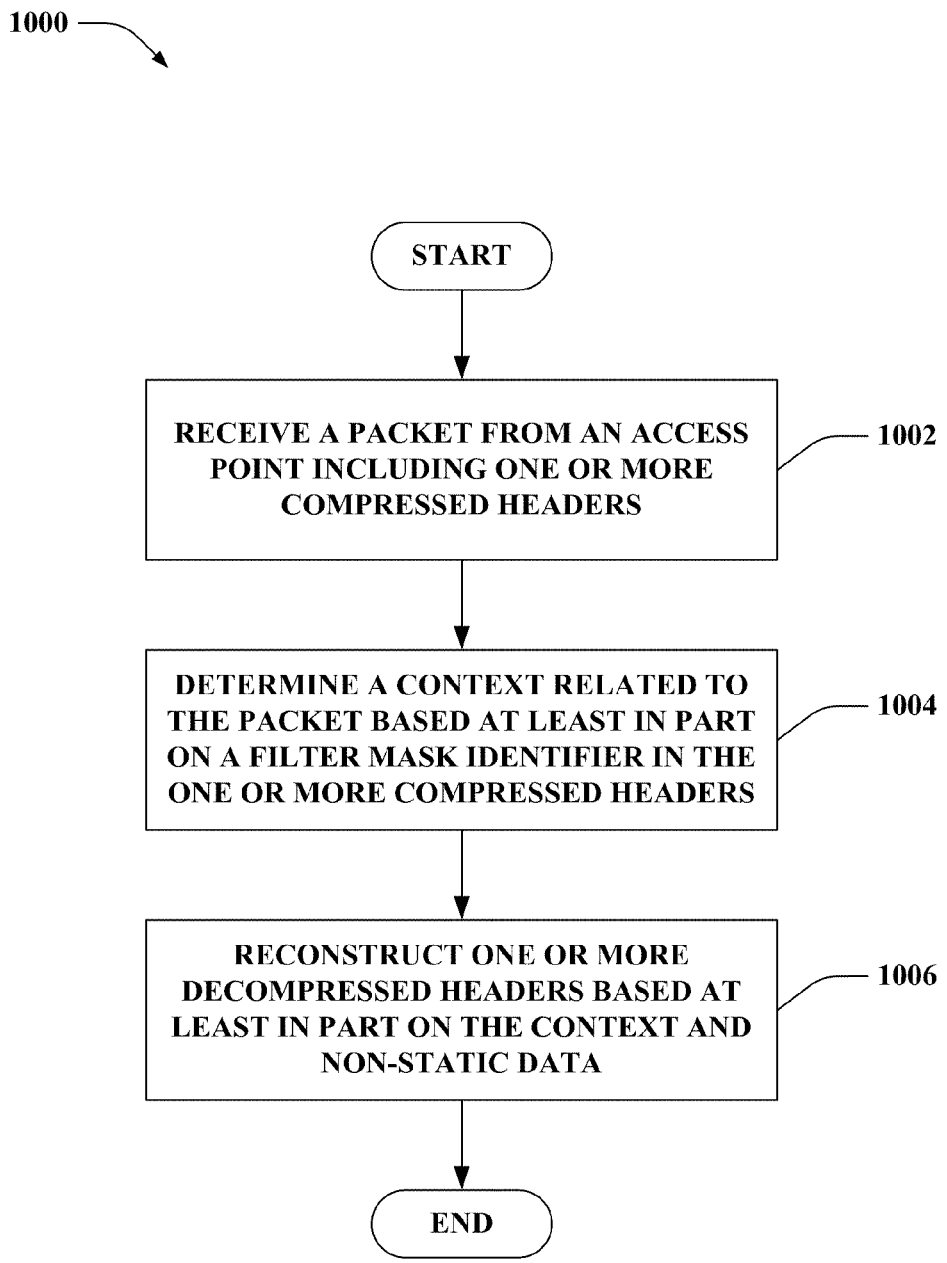
FIG. 10 is an illustration of an example methodology for decompressing compressed headers based at least in part on determining a filter mask identifier.

Turning to FIG. 10, an example methodology 1000 that facilitates decompressing headers of a received packet according to a decompression context is illustrated. At 1002, a packet can be received from an access point including one or more compressed headers. For example, the headers can be determined as compressed according to a compression indicator in the packet or headers (e.g., in a PDCP layer and/or one or more bits within the compressed headers). At 1004, a context related to the packet can be determined based at least in part on a filter mask identifier in the one or more compressed headers. As described, for example, this can include locating a context that is correlated with the filter mask identifier. Moreover, the context can be generated upon receiving an initial packet, a context received from an access point (e.g., from which the packet is received), etc., as described. In addition, the context can include one or more headers along with parameters for inserting non-static data in the headers, static data related to the headers along with location information for inserting the static data with received non-static data, and/or the like. At 1006, one or more decompressed headers can be reconstructed based at least in part on the context and non-static data.

Figure 11:
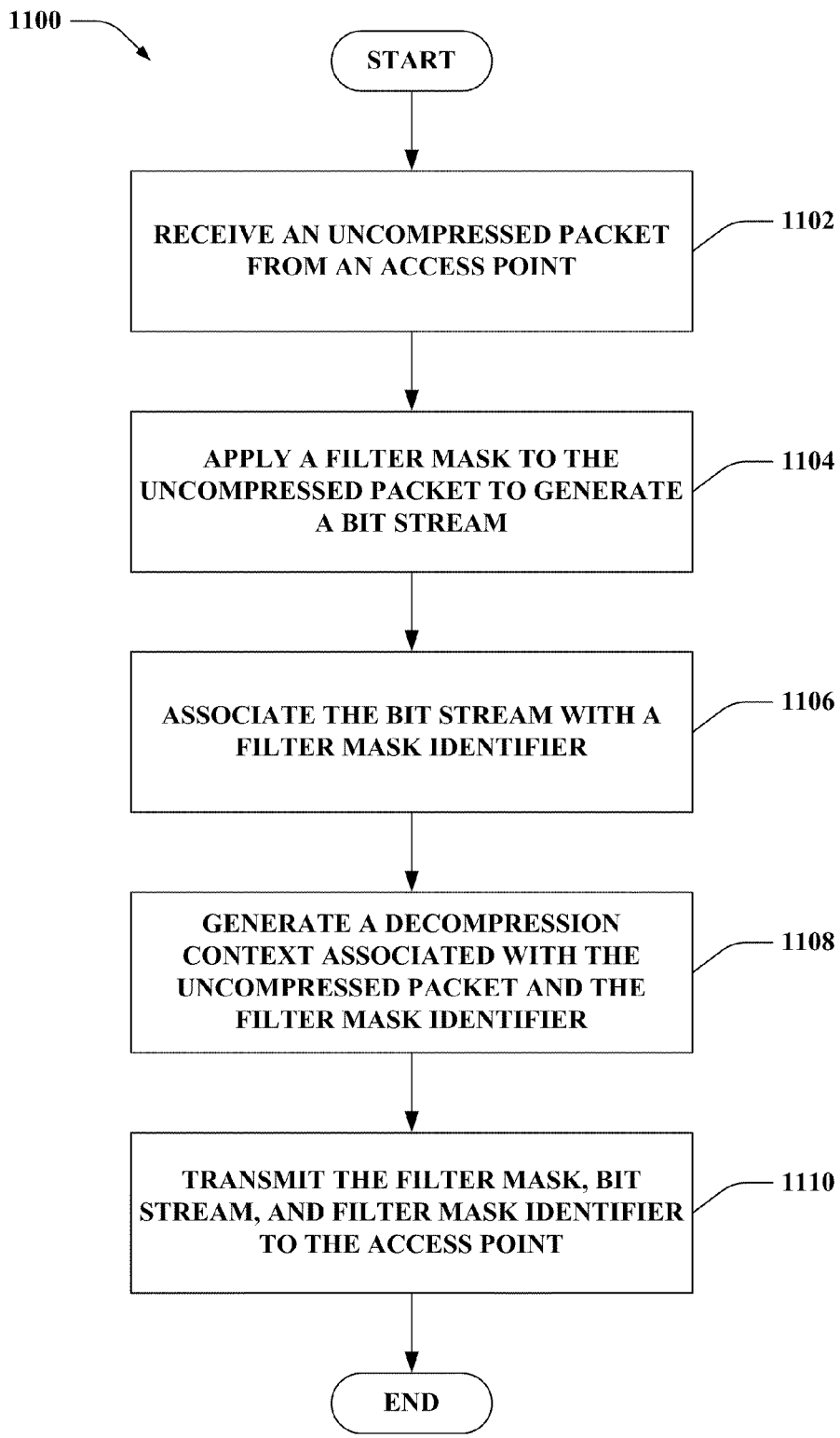
FIG. 11 is an illustration of an example methodology that provides compression parameters to an upstream access point.

Referring to FIG. 11, an example methodology 1100 is depicted that facilitates communicating parameters for compressing packet headers in relay communications. At 1102, an uncompressed packet can be received from an access point. For example, the access point can be a donor access point or other upstream access point. At 1104, a filter mask can be applied to the uncompressed packet to generate a bit stream. As described, the bit stream can correlate to static data of the header (e.g., IP address, TEID, etc.). At 1106, the bit stream can be associated with a filter mask identifier. For example, the filter mask identifier can be selected for the bit stream and filter mask (e.g., randomly, pseudo-randomly based on one or more aspects or values of the bit stream or filter mask, according to a pattern, and/or the like).

At 1108, a decompression context associated with the uncompressed packet and the filter mask identifier can be generated. For example, as described, the decompression context can include parameters or instructions for decompressing one or more compressed headers based at least in part on receiving the filter mask identifier. In an example, the decompression context can include the static data related to the bit stream along with locations for inserting the static data in received non-static data, as described. In another example, the decompression context can include the one or more headers along with location information related to replacing subsequently received non-static data in the one or more headers. In addition, the filter mask identifier can be associated to the context for subsequent identification in decompressing one or more headers. At 1110, the filter mask, bit stream, and filter mask identifier can be transmitted to the access point to facilitate compressing headers that have similar static header data as does the packet.

Figure 12:
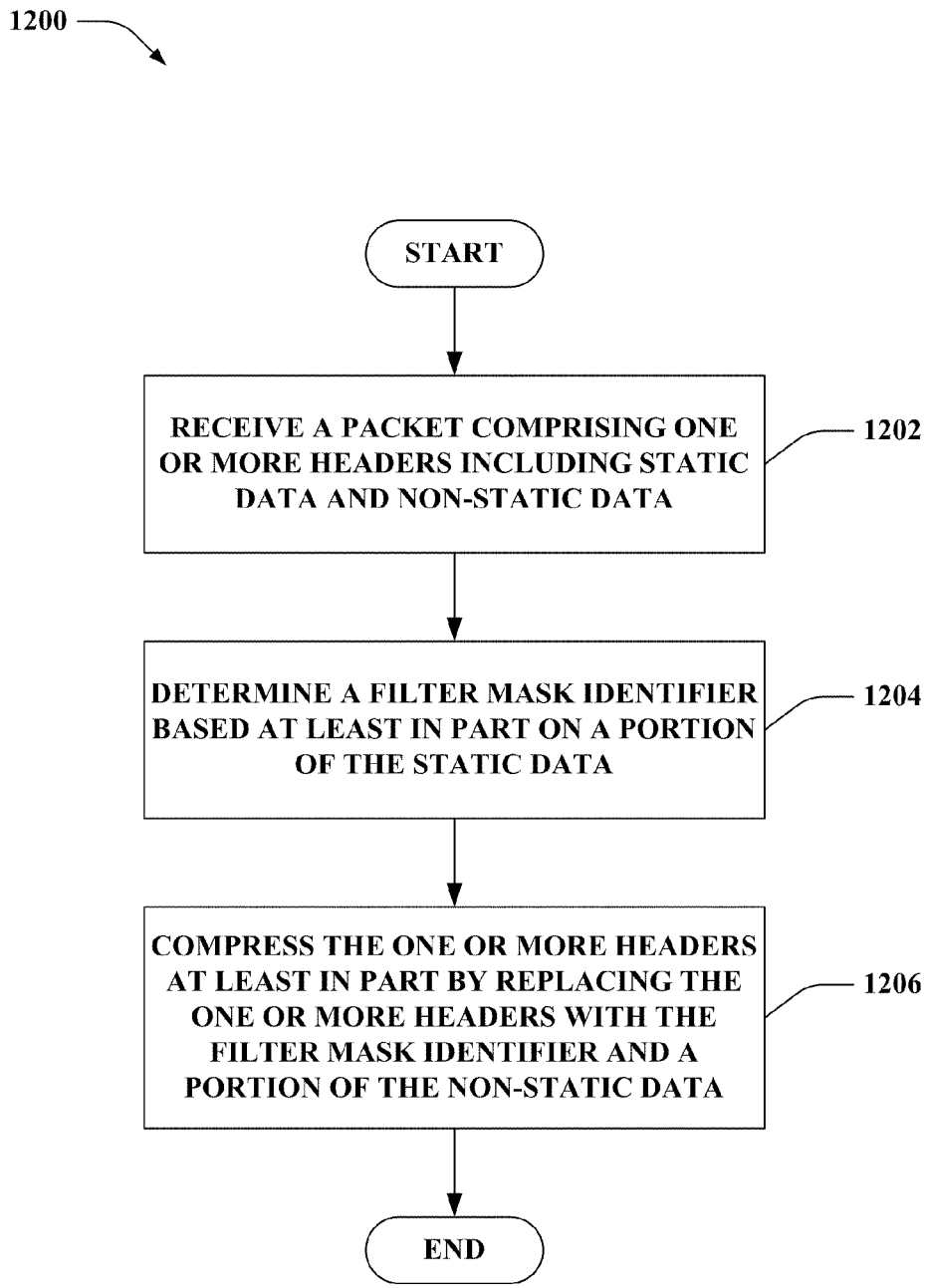
FIG. 12 is an illustration of an example methodology for compressing one or more headers based at least in part on a filter mask identifier and non-static data.

Turning to FIG. 12, an example methodology 1200 that facilitates compressing headers of a received packet according to a filter mask identifier is illustrated. At 1202, a packet comprising one or more headers including static data and non-static data can be received. As described, at least a portion of the static data can be compressed to facilitate efficiently communicating the packet to one or more access points. At 1204, a filter mask identifier can be determined based at least in part on a portion of the static data. For example, as described, the filter mask identifier can be determined by applying a filter mask to the packet to generate a resulting bit stream (e.g., comprising at least a portion of the static data), and matching the bit stream to a disparate bit stream that correlates to a filter mask identifier. In another example, the filter mask identifier can be determined based on the static data without applying the filter mask. In either case, at 1206, the one or more headers can be compressed at least in part by replacing the one or more headers with the filter mask identifier and a portion of the non-static data.

Figure 13:
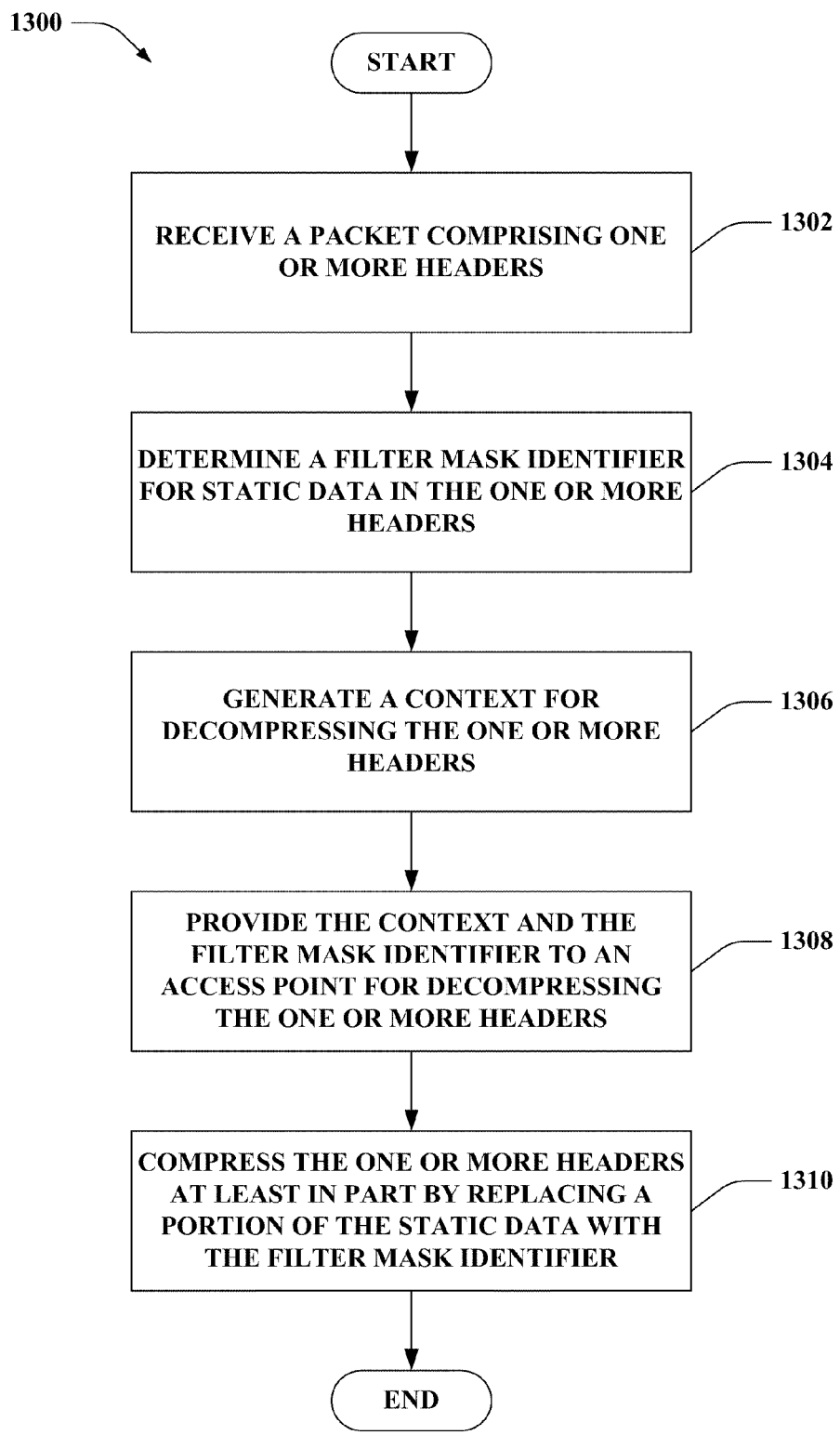
FIG. 13 is an illustration of an example methodology that compresses one or more headers that can be decompressed using a context provided to an access point.

Referring to FIG. 13, an example methodology 1300 that facilitates compressing one or more packets and providing a context for decompressing the one or more packets is illustrated. At 1302, a packet comprising one or more headers can be received. As described, for example, the packet can be an upstream packet received from a downstream device or access point. At 1304, a filter mask identifier can be determined for static data in the one or more headers. As described, for example, the filter mask identifier can be generated or selected randomly, pseudo-randomly, according to a pattern, etc., based on the static data. At 1306, a context can be generated for decompressing the one or more headers. Along with an association to the filter mask identifier, for example, the context can also include one or more parameters related to the one or more headers, location information for inserting non-static data in the one or more headers, the static data, location information for inserting the static data in non-static data received in one or more compressed headers, and/or the like. At 1308, the context and filter mask identifier can be provided to an access point for decompressing the one or more headers, and at 1310, the one or more headers can be compressed at least in part by replacing a portion of the static data with the filter mask identifier.

It will be appreciated that, in accordance with one or more aspects described herein, inferences can be made regarding generating a decompression context, selecting a filter mask, and/or other aspects described herein. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 14:
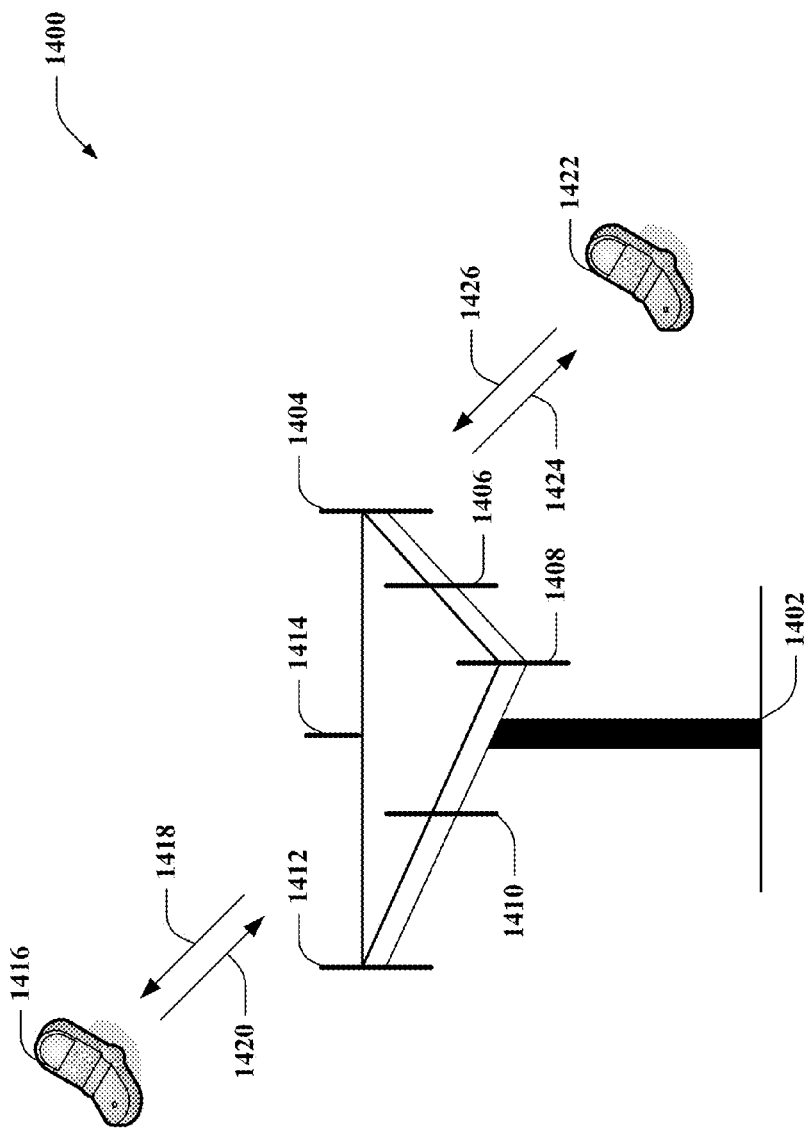
FIG. 14 is an illustration of a wireless communication system in accordance with various aspects set forth herein.

Referring now to FIG. 14, a wireless communication system 1400 is illustrated in accordance with various embodiments presented herein. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology (not shown).

According to an example, system 1400 can be a multiple-input multiple-output (MIMO) communication system. Further, system 1400 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1402 can communicate to the mobile devices 1416 and 1422 over the channels, which can be create for various types of data. For example, channels can be created for communicating various types of general communication data, control data (e.g., quality information for other channels, acknowledgement indicators for data received over channels, interference information, reference signals, etc.), and/or the like.

Figure 15:
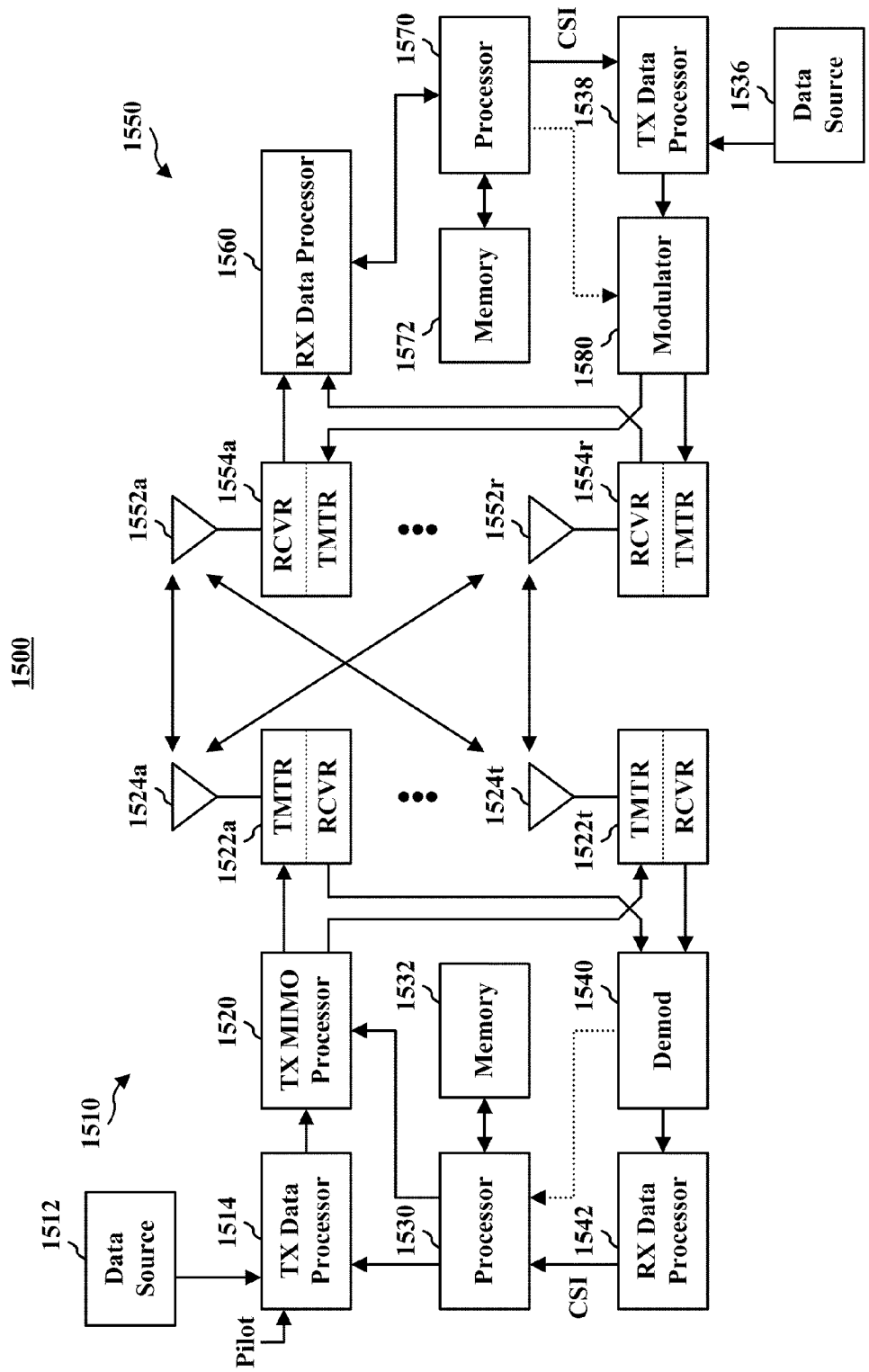
FIG. 15 is an illustration of an example wireless network environment that can be employed in conjunction with the various systems and methods described herein.

FIG. 15 shows an example wireless communication system 1500. The wireless communication system 1500 depicts one base station 1510 and one mobile device 1550 for sake of brevity. However, it is to be appreciated that system 1500 can include more than one base station and/or more than one mobile device, wherein additional base stations and/or mobile devices can be substantially similar or different from example base station 1510 and mobile device 1550 described below. In addition, it is to be appreciated that base station 1510 and/or mobile device 1550 can employ the systems (FIGS. 1-6, 8, and 14), headers and filter masks (FIG. 7), protocol stacks (FIG. 9) and/or methods (FIGS. 10-13) described herein to facilitate wireless communication therebetween.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various aspects, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At mobile device 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which precoding matrix to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from mobile device 1550 are received by antennas 1524, conditioned by receivers 1522, demodulated by a demodulator 1540, and processed by a RX data processor 1542 to extract the reverse link message transmitted by mobile device 1550. Further, processor 1530 can process the extracted message to determine which precoding matrix to use for determining the beamforming weights.

Processors 1530 and 1570 can direct (e.g., control, coordinate, manage, etc.) operation at base station 1510 and mobile device 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

Figure 16:
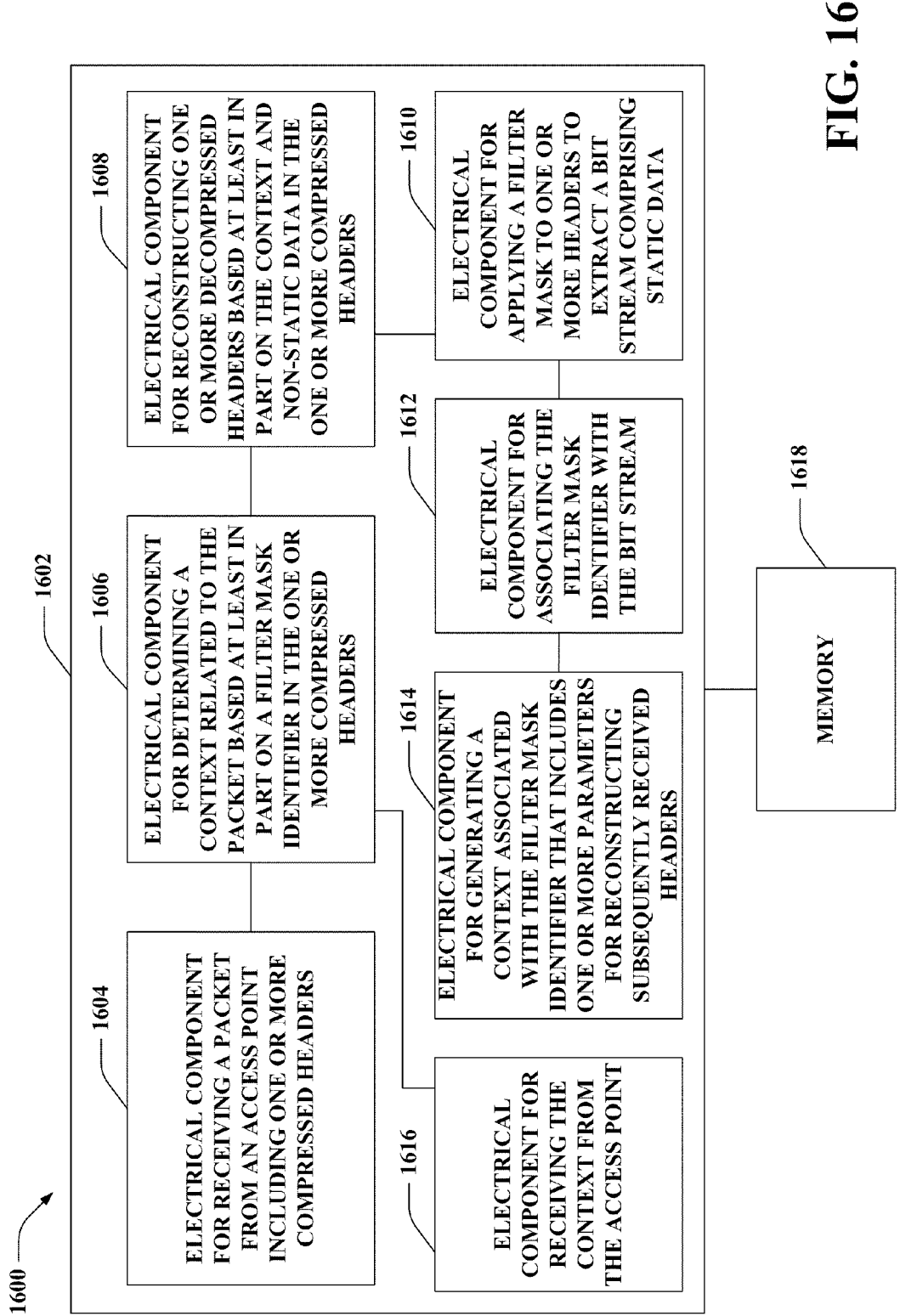
FIG. 16 is an illustration of an example system that facilitates decompressing one or more headers according to a received or generated context.

With reference to FIG. 16, illustrated is a system 1600 that facilitates decompressing packet headers for efficient relay communications. For example, system 1600 can reside at least partially within a base station, mobile device, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for receiving a packet from an access point including one or more compressed headers 1604. For example, as described, the packets can be compressed by including a filter mask identifier instead of related static data. Additionally, logical grouping 1602 can include an electrical component for determining a context related to the packet based at least in part on a filter mask identifier in the one or more compressed headers 1606. As described, the context can include instructions or parameters for decompressing the one or more compressed headers according to the filter mask identifier.

Moreover, logical grouping 1602 can include an electrical component for reconstructing one or more decompressed headers based at least in part on the context and non-static data in the one or more compressed headers 1608. As described, for example, the context can include one or more headers previously received from which the filter mask identifier is generated, along with location information related to replacing non-static data in the one or more headers with that received in the one or more compressed headers. In another example, as described, the context can include static data extracted from the one or more headers when generating the context and associated filter mask identifier, along with location information for inserting the static data in the received non-static data to create the one or more decompressed headers.

In addition, logical grouping 1602 can include an electrical component for applying a filter mask to one or more headers to extract a bit stream comprising static data 1610 and an electrical component for associating the filter mask identifier with the bit stream 1612. As described, for example, electrical component 1612 can match the bit stream to a disparate bit stream corresponding to the filter mask identifier. Logical grouping 1602 also includes an electrical component for generating a context associated with the filter mask identifier that includes one or more parameters for reconstructing subsequently received headers 1614. Moreover, logical grouping 1602 can include an electrical component for receiving the context from the access point 1616. This can be alternative to electrical components 1610, 1612, and 1614, as described in one example, and/or such that electrical components 1610, 1612, and 1614 apply for downlink communications and electrical component 1616 is employed for uplink communications. Additionally, system 1600 can include a memory 1618 that retains instructions for executing functions associated with electrical components 1604, 1606, 1608, 1610, 1612, 1614, and 1616. While shown as being external to memory 1618, it is to be understood that one or more of electrical components 1604, 1606, 1608, 1610, 1612, 1614, and 1616 can exist within memory 1618.

Figure 17:
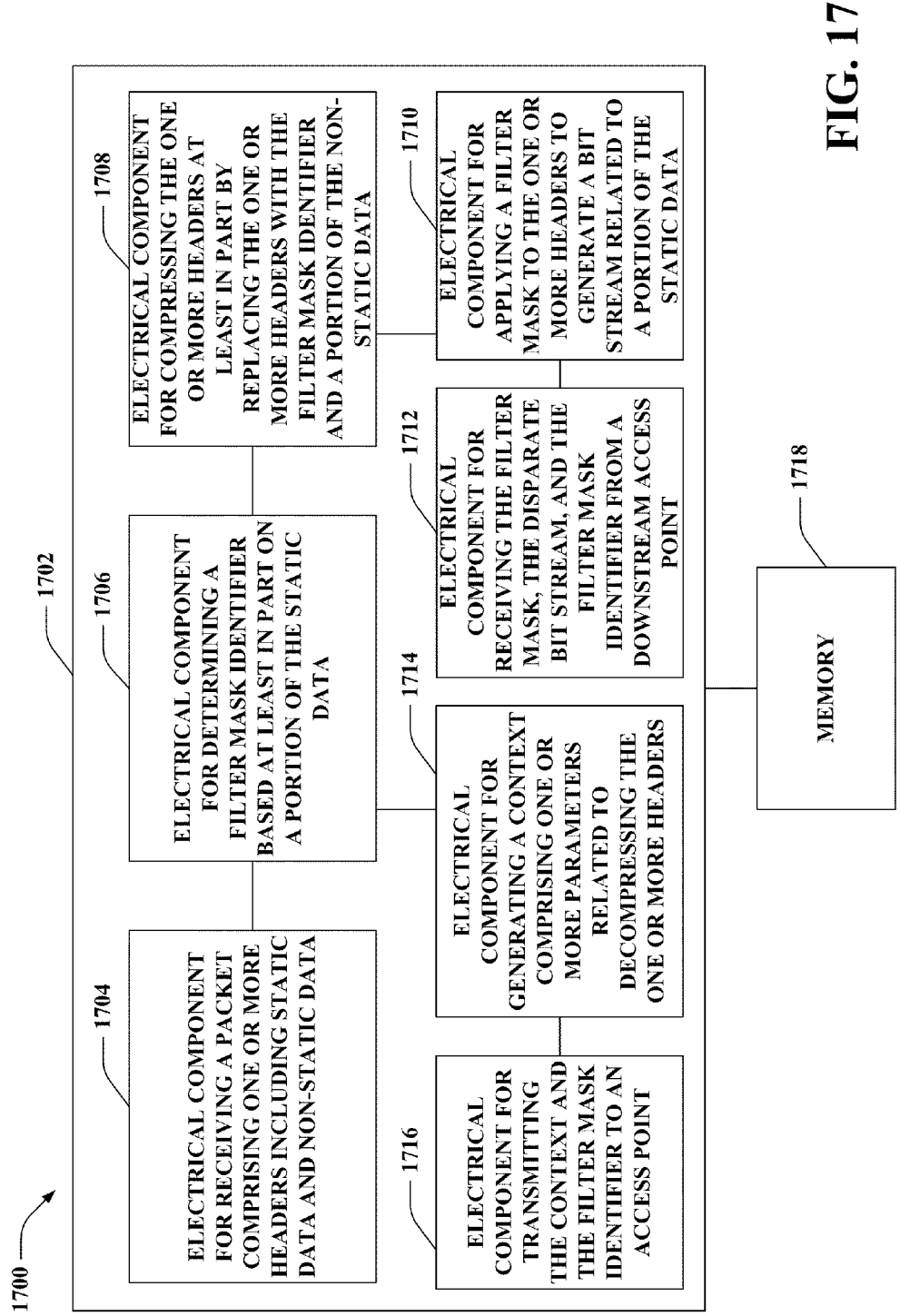
FIG. 17 is an illustration of an example system that facilitates compressing one or more headers using a filter mask identifier and non-static data.

With reference to FIG. 17, illustrated is a system 1700 that facilitates compressing packet headers for efficient relay communications. For example, system 1700 can reside at least partially within a base station, mobile device, etc. It is to be appreciated that system 1700 is represented as including functional blocks, which can be functional blocks that represent functions implemented by a processor, software, or combination thereof (e.g., firmware). System 1700 includes a logical grouping 1702 of electrical components that can act in conjunction. For instance, logical grouping 1702 can include an electrical component for receiving a packet comprising one or more headers including static data and non-static data 1704. As described, for example, the static data can relate to an IP address, TEID, etc., and the non-static data can relate to a header length, sequence number, etc. Additionally, logical grouping 1702 can include an electrical component for determining a filter mask identifier based at least in part on a portion of the static data 1706. This can include applying a filter mask and matching a resulting bit stream identifier, associating a portion of the static data with the filter mask identifier, and/or the like, as described. Moreover, logical grouping 1702 can include an electrical component for compressing the one or more headers at least in part by replacing the one or more headers with the filter mask identifier and a portion of the non-static data 1708.

In addition, logical grouping 1702 can include an electrical component for applying a filter mask to the one or more headers to generate a bit stream related to a portion of the static data 1710. In this regard, for example, electrical component 1706 can match the bit stream to a disparate bit stream that correlates to the filter mask identifier, as described. Further, logical grouping 1702 can include an electrical component for receiving the filter mask, the disparate bit stream, and the filter mask identifier from a downstream access point 1712. The foregoing parameters can allow electrical component 1708 to compress the one or more headers, as described. Additionally or alternatively, logical grouping 1702 can include an electrical component for generating a context comprising one or more parameters related to decompressing the one or more headers 1714, and an electrical component for transmitting the context and the filter mask identifier to an access point 1716. In this example, the access point can then decompress compressed headers in a packet transmitted thereto. Additionally, system 1700 can include a memory 1718 that retains instructions for executing functions associated with electrical components 1704, 1706, 1708, 1710, 1712, 1714, and 1716. While shown as being external to memory 1718, it is to be understood that one or more of electrical components 1704, 1706, 1708, 1710, 1712, 1714, and 1716 can exist within memory 1718.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions, procedures, etc. may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
    receiving a packet from an access point including one or more compressed headers;
    determining a context related to the packet based at least in part on a filter mask identifier in the one or more compressed headers;
    extracting non-static data from the one or more compressed headers; and
    reconstructing one or more decompressed headers based at least in part on the context and the non-static data extracted from the one or more compressed headers.

2. The method of claim 1, further comprising:
    receiving an initial packet from the access point including one or more headers, wherein the access point is a donor access point;
    applying a filter mask to the one or more headers to extract a bit stream comprising static data;
    associating the filter mask identifier with the bit stream; and
    communicating the filter mask, the bit stream, and the filter mask identifier to the donor access point.

3. The method of claim 2, further comprising generating the context based at least in part on associating the filter mask identifier with one or more parameters for reconstructing subsequently received headers.

4. The method of claim 3, wherein the one or more parameters comprises at least a portion of the one or more headers and location information related to inserting the non-static data in the one or more headers, and the reconstructing the one or more decompressed headers is based at least in part on inserting the non-static data in the one or more headers according to the location information.

5. The method of claim 3, wherein the one or more parameters comprises location information related to inserting the static data in the non-static data, and the reconstructing the one or more decompressed headers is based at least in part on inserting the static data within the non-static data according to the location information.

6. The method of claim 2, further comprising communicating a hop count to the donor access point related to the filter mask, the bit stream, and the filter mask identifier.

7. The method of claim 6, further comprising receiving the hop count from a downstream access point and incrementing the hop count.

8. The method of claim 2, wherein the static data includes an internet protocol address and a tunnel endpoint identifier in the one or more headers.

9. The method of claim 1, wherein the reconstructing the one or more decompressed headers is based at least in part on decompressing the non-static data.

10. The method of claim 9, wherein the decompressing the non-static data includes decompressing a general packet radio service tunneling protocol sequence number according to a number of least significant bits of the general packet radio service tunneling protocol sequence number.

11. The method of claim 1, further comprising determining that the one or more compressed headers are compressed based at least in part on one or more compression indicators in the packet.

12. The method of claim 11, wherein at least one of the one or more compression indicators corresponds to a reserved bit in a packet data convergence protocol layer of the packet.

13. The method of claim 1, further comprising receiving the context from the access point.

14. The method of claim 13, wherein the context includes one or more headers and location information related to inserting the non-static data in the one or more headers, and the reconstructing the one or more decompressed headers is based at least in part on inserting the non-static data in the one or more headers according to the location information.

15. The method of claim 13, wherein the context includes location information related to inserting static data in the context within the non-static data, and the reconstructing the one or more decompressed headers is based at least in part on inserting the static data within the non-static data according to the location information.

16. The method of claim 13, further comprising requesting the context from the access point based at least in part on the filter mask identifier.

17. The method of claim 13, wherein the determining the context related to the packet is further based at least in part on locating the filter mask identifier of one of a plurality of contexts related to a hop count.

18. A wireless communications apparatus, comprising:
    at least one processor configured to:
        obtain a packet from an access point including one or more compressed headers;
        associate a context with the packet based at least in part on a filter mask identifier extracted from the one or more compressed headers;
        extract non-static data from the one or more compressed headers; and
        decompress the one or more compressed headers into one or more decompressed headers according to the context and the non-static data extracted from the one or more compressed headers; and
    a memory coupled to the at least one processor.

19. The wireless communications apparatus of claim 18, wherein the at least one processor is further configured to:
    obtain an initial packet from the access point including one or more headers;
    generate a bit stream at least in part by applying a filter mask to the one or more headers;
    select the filter mask identifier for associating with the bit stream; and
    provide the filter mask, the bit stream, and the filter mask identifier to the access point.

20. The wireless communications apparatus of claim 19, wherein the at least one processor is further configured to create the context to include one or more parameters for decompressing compressed headers received from the access point and correlate the filter mask identifier with the context.

21. The wireless communications apparatus of claim 19, wherein the at least one processor is further configured to provide a hop count to the access point related to the filter mask, the bit stream, and the filter mask identifier.

22. The wireless communications apparatus of claim 18, wherein the at least one processor decompresses the one or more compressed headers at least in part by decompressing the non-static data in the one or more compressed headers.

23. The wireless communications apparatus of claim 18, wherein the at least one processor is further configured to determine that the one or more compressed headers are compressed based at least in part on one or more compression indicators in the packet.

24. The wireless communications apparatus of claim 18, wherein the at least one processor is further configured to receive the context from the access point.

25. An apparatus, comprising:
    means for receiving a packet from an access point including one or more compressed headers;
    means for determining a context related to the packet based at least in part on a filter mask identifier in the one or more compressed headers;
    means for extracting non-static data from the one or more compressed headers; and
    means for reconstructing one or more decompressed headers based at least in part on the context and the non-static data extracted from the one or more compressed headers.

26. The apparatus of claim 25, further comprising:
    means for applying a filter mask to one or more headers to extract a bit stream comprising static data; and
    means for associating the filter mask identifier with the bit stream, wherein the means for receiving receives an initial packet from the access point including the one or more headers, and communicates the filter mask, the bit stream, and the filter mask identifier to the access point.

27. The apparatus of claim 26, further comprising means for generating the context associated with the filter mask identifier that includes one or more parameters for reconstructing subsequently received headers.

28. The apparatus of claim 26, wherein the means for receiving additionally communicates a hop count related to the filter mask, the bit stream, and the filter mask identifier to the access point.

29. The apparatus of claim 25, wherein the means for reconstructing reconstructs the one or more decompressed headers based further at least in part on decompressing at least a portion of the non-static data.

30. The apparatus of claim 25, wherein the means for receiving the packet further determines that the one or more compressed headers are compressed based at least in part on one or more compression indicators in the packet.

31. The apparatus of claim 25, further comprising means for receiving the context from the access point.

32. A computer program product, comprising:
    a non-transitory computer-readable storage medium comprising:
        code for causing at least one computer to obtain a packet from an access point including one or more compressed headers;
        code for causing the at least one computer to associate a context with the packet based at least in part on a filter mask identifier extracted from the one or more compressed headers;
        code for causing the at least one computer to extract non-static data from the one or more compressed headers; and
        code for causing the at least one computer to decompress the one or more compressed headers into one or more decompressed headers according to the context and the non-static data extracted from the one or more compressed headers.

33. The computer program product of claim 32, wherein the computer-readable storage medium further comprises:
    code for causing the at least one computer to obtain an initial packet from the access point including one or more headers;
    code for causing the at least one computer to generate a bit stream at least in part by applying a filter mask to the one or more headers;
    code for causing the at least one computer to select the filter mask identifier for associating with the bit stream; and
    code for causing the at least one computer to provide the filter mask, the bit stream, and the filter mask identifier to the access point.

34. The computer program product of claim 33, wherein the computer-readable storage medium further comprises code for causing the at least one computer to create the context to include one or more parameters for decompressing compressed headers received from the access point and correlate the filter mask identifier with the context.

35. The computer program product of claim 33, wherein the computer-readable storage medium further comprises code for causing the at least one computer to provide a hop count to the access point related to the filter mask, the bit stream, and the filter mask identifier.

36. The computer program product of claim 32, wherein the code for causing the at least one computer to decompress decompresses the one or more compressed headers at least in part by decompressing the non-static data in the one or more compressed headers.

37. The computer program product of claim 32, wherein the computer-readable storage medium further comprises code for causing the at least one computer to determine that the one or more compressed headers are compressed based at least in part on one or more compression indicators in the packet.

38. The computer program product of claim 32, wherein the computer-readable storage medium further comprises code for causing the at least one computer to receive the context from the access point.

39. An apparatus, comprising:
    a physical packet communicating component that receives a packet from an access point including one or more compressed headers;
    a physical component that determines a context related to the packet based at least in part on a filter mask identifier in the one or more compressed headers;
    a physical non-static data determining component that extracts non-static data from the one or more compressed headers; and
    a physical header decompressing component that reconstructs one or more decompressed headers based at least in part on the context and non-static data in the one or more compressed headers.

40. The apparatus of claim 39, further comprising:
    a physical filter mask selecting component that applies a filter mask to one or more headers to extract a bit stream comprising static data; and
    an physical identifier assigning component that associates the filter mask identifier with the bit stream, wherein the physical packet communicating component receives an initial packet from the access point including the one or more headers, and communicates the filter mask, the bit stream, and the filter mask identifier to the access point.

41. The apparatus of claim 40, further comprising a physical decompression context associating component that generates the context associated with the filter mask identifier including one or more parameters for reconstructing subsequently received headers.

42. The apparatus of claim 40, wherein the physical packet communicating component additionally communicates a hop count related to the filter mask, the bit stream, and the filter mask identifier to the access point.

43. The apparatus of claim 39, wherein the physical header decompressing component reconstructs the one or more decompressed headers based further at least in part on decompressing at least a portion of the non-static data.

44. The apparatus of claim 39, wherein the physical packet communicating component further determines that the one or more compressed headers are compressed based at least in part on one or more compression indicators in the packet.

45. The apparatus of claim 39, wherein the physical component is a decompression context receiving component that further obtains the context from the access point.

* * * * *